(12) United States Patent
Yun et al.

(10) Patent No.: US 12,282,793 B2
(45) Date of Patent: Apr. 22, 2025

(54) VIRTUAL MACHINE MANAGEMENT METHOD BASED ON PREDICTION OF VIRTUAL MACHINE WORKLOAD PREDICTION FOR VIRTUAL MACHINES DEPLOYED ON SERVERS AND VIRTUAL MACHINE MANAGEMENT SYSTEM IMPLEMENTING THE SAME

(71) Applicant: Okestro Co., Ltd., Seoul (KR)

(72) Inventors: Ho Yeong Yun, Seoul (KR); Young Gwang Kim, Seoul (KR); Min Jun Kim, Seoul (KR)

(73) Assignee: OKESTRO CO., LTD., Seoul (KR)

( * ) Notice: Subject to any disclaimer, the term of this patent is extended or adjusted under 35 U.S.C. 154(b) by 0 days.

(21) Appl. No.: 18/126,058

(22) Filed: Mar. 24, 2023

(65) Prior Publication Data

US 2023/0229486 A1    Jul. 20, 2023

Related U.S. Application Data

(63) Continuation of application No. 16/939,385, filed on Jul. 27, 2020, now Pat. No. 11,620,150.

(30) Foreign Application Priority Data

Jul. 31, 2019   (KR) .................. 10-2019-0092851
Aug. 19, 2019   (KR) .................. 10-2019-0101200
Sep. 5, 2019    (KR) .................. 10-2019-0110079

(51) Int. Cl.
*G06F 9/50*     (2006.01)
*G06F 9/455*    (2018.01)

(52) U.S. Cl.
CPC ........ *G06F 9/5033* (2013.01); *G06F 9/45558* (2013.01); *G06F 2009/4557* (2013.01); *G06F 2009/45595* (2013.01)

(58) Field of Classification Search
CPC ........ G06F 9/45558; G06F 2009/4557; G06F 2009/45595; G06F 9/5033
See application file for complete search history.

(56) References Cited

U.S. PATENT DOCUMENTS 10,564,998 B1     2/2020  Gritter et al.
2010/0332658 A1  12/2010  Elyashev
(Continued)

FOREIGN PATENT DOCUMENTS

JP    2010244181 A    10/2010
JP    2012159928 A     8/2012
(Continued)

OTHER PUBLICATIONS

J. Tan, P. Dube, X. Meng, and L. Zhang, "Exploiting resource usage patterns for better utilization prediction," in Proc. 31st Int. Conf. Distrib. Comput. Syst. Workshops. Minneapolis, MN, USA, Jun. 2011, pp. 14-19 (Year: 2011).*
(Continued)

*Primary Examiner* — Jacob D Dascomb
(74) *Attorney, Agent, or Firm* — Panitch Schwarze Belisario & Nadel LLP

(57) ABSTRACT

A virtual machine (VM) management method may involve simulating a change in deployment of VMs deployed on physical servers including a first physical server and a second physical server physically separated from the first physical server. Server workload prediction based on possible VM deployment may be used for scheduling deployment of VMs to obtain a satisfactory deployment of the VMs on the servers. This may involve classification of storage loads of the VMs, forming a prediction model for predicting prediction load based on storage loads in a classification, and
(Continued)

selecting a prediction model for use in determining a target prediction load on a physical server as a result of target VM being analyzed.

9 Claims, 15 Drawing Sheets

(56) References Cited

U.S. PATENT DOCUMENTS

| | | |
|---|---|---|
| 2011/0225277 A1 | 9/2011 | Freimuth et al. |
| 2013/0174152 A1 | 7/2013 | Yu |
| 2015/0149620 A1 | 5/2015 | Banerjee et al. |
| 2015/0370583 A1 | 12/2015 | Shah et al. |
| 2019/0163517 A1 | 5/2019 | Fontoura et al. |
| 2020/0034270 A1* | 1/2020 | Desai ............... H04L 41/40 |
| 2020/0285503 A1 | 9/2020 | Dou et al. |
| 2020/0310876 A1 | 10/2020 | Featonby et al. |
| 2021/0011830 A1* | 1/2021 | Khokhar ............ G06F 3/0632 |
| 2023/0153142 A1 | 5/2023 | Shabah et al. |

FOREIGN PATENT DOCUMENTS

| | | |
|---|---|---|
| JP | 5827594 | 12/2015 |
| JP | 5827594 B2 | 12/2015 |
| KR | 20120023703 A | 3/2012 |
| KR | 101886317 B1 | 8/2018 |

OTHER PUBLICATIONS

Xue LS, Abd Majid NA, Sundararajan EA (2017), "Dynamic virtual machine allocation policy for load balancing using principal component analysis and clustering technique in cloud computing," J Telecommun Electron Comput Eng 10(3):47-52 (Year: 2017).*
Office Action issued May 11, 2022 in U.S. Appl. No. 16/939,385.
Notice of Allowance issued Dec. 12, 2022 in U.S. Appl. No. 16/939,385.
Office Action issued Dec. 22, 2023 in U.S. Appl. No. 18/126,118.
Notice of Allowance issued May 9, 2024 in U.S. Appl. No. 18/126,118.

* cited by examiner

VIRTUAL MACHINE MANAGEMENT METHOD BASED ON PREDICTION OF VIRTUAL MACHINE WORKLOAD PREDICTION FOR VIRTUAL MACHINES DEPLOYED ON SERVERS AND VIRTUAL MACHINE MANAGEMENT SYSTEM IMPLEMENTING THE SAME

CROSS-REFERENCE TO RELATED APPLICATIONS

This application is a Continuation of co-pending U.S. patent application Ser. No. 16/939,385, filed Jul. 27, 2020 (and corresponding to U.S. Patent Application Publication No. 2021/0034403), which claims priority under 35 U.S.C. § 119(b) to Korean Application No. 10-2019-0110079, filed Sep. 5, 2019, Korean Application No. 10-2019-0101200, filed Aug. 19, 2019, and Korean Application No. 10-2019-0092851, filed Jul. 31, 2019, the disclosures of each of which are incorporated herein by reference.

BACKGROUND

1. Field of the Invention

The present invention relates to a virtual machine management method and a virtual machine management system implementing the same and, more particularly, to a method of effectively processing and managing a virtual machine and a virtual machine management system for implementing the method.

2. Discussion of Related Art

Data centers which consume about 2% of global electric power are high density and high energy-consuming buildings which use the most power among individual buildings. However, data centers are managed in a conservative manner in which stability is the top priority and thus are being inefficiently run at the present time. In the future, due to spread of the Internet of Things (IoT), big data, cloud technology, etc., small-scale data centers are expected to be integrated into hyperscale or mega data centers which are large-scale data centers. For this reason, data center running and management are also expected to be complicated due to extension of infrastructure. Consequently, it is very important to maximize the efficiency of running a data center by switching unnecessary servers to an idle mode or a power-down mode and managing available servers as stably as possible, and also it is very important to appropriately deploy numerous virtual machines in a data center so as to reduce operational cost by reducing power consumption.

In a virtualization environment in which physical machines (PMs) are configured as virtual machines (VMs), running VMs may be moved to a different PM, which is referred to as live migration. This is a necessary management method for efficiently managing a data center.

Technology for running a data center by migrating VMs (Japanese Patent Publication No. 5827594, registered on Oct. 23, 2015) has been developed and released to efficiently manage a data center. However, there is an inconvenience in that it is not possible to predict results before applying a management program to a data center.

Also, according to the related technology, VMs are migrated on the basis of a specific time point, and thus a specific server may be overloaded.

Further, technologies which have been released thus far relate to data center running, and it is not possible to predict results before applying a management program to a data center.

SUMMARY OF THE INVENTION

The present invention is directed to providing a virtual machine (VM) management method of managing VMs on physical servers with maximum efficiency and a VM management system for implementing the VM management method.

Objects to be achieved by embodiments of the present invention are not limited thereto, and objects not mentioned above will be clearly understood by those of ordinary skill in the art from this specification and the accompanying drawings.

According to an aspect of the present invention, there is provided a VM workload prediction method implemented by a prediction device to calculate a prediction load, which is a load on a physical server predicted to be imposed by a plurality of VMs installed on the physical server, the method including: collecting storage load information which is information related to a storage load corresponding to a load on the physical server caused by the VMs installed on the physical server, classifying storage loads of the VMs into groups by a predetermined classification method, when the storage loads are arranged on the basis of an arrangement reference which is a certain reference, forming a prediction model for calculating a prediction load from storage loads classified into each group, selecting at least one of a plurality of prediction models by a predetermined selection method to increase prediction accuracy of a target prediction load which is a load on the physical server predicted to be caused by the a target VM to be analyzed, and calculating target prediction load information which is information related to the target prediction load according to a predetermined calculation method on the basis of target storage load information, which is information related to a target storage load corresponding to a load on the physical server caused by the target VM, and a selection model which is the selected prediction model.

The predetermined selection method may include a predetermined first selection method of selecting, when the target storage load is located in a group of storage loads after the target storage load is arranged on the basis of the arrangement reference, a prediction model produced on the basis of the storage loads classified into the group in which the target storage load is located as the selection model.

The predetermined selection method may include a predetermined second selection method of selecting, when the target storage load is not located in any group of storage loads after the target storage load is arranged on the basis of the arrangement reference, prediction models corresponding to groups of storage loads satisfying a predetermined condition as the selection model.

The predetermined condition may require the group to be located within a certain distance from the target storage load when the target storage load is arranged on the basis of the arrangement reference.

The predetermined condition may require the group to be located within a reference range from a reference distance which is the shortest one of distances from the target storage load to the groups of storage loads when the target storage load is arranged on the basis of the arrangement reference.

The predetermined calculation method may be a method of calculating the target prediction load information in different ways depending on whether the selection model is singular or plural.

The predetermined calculation method may be a method of calculating the target prediction load information by inputting the target storage load information to the selection model when the selection model is singular.

The predetermined calculation method may be a method of calculating, when the selection model has a plurality of selection models, the target prediction load information by considering weights calculated on the basis of a ratio of separation distances from the target storage load to storage load groups corresponding to the selection models after the target storage load is arranged on the basis of the arrangement reference.

The predetermined calculation method may be a method of calculating the target prediction load information for a certain time period.

According to another aspect of the present invention, there is provided a VM deployment method of deploying a plurality of VMs on a first physical server and a second physical server to efficiently run a physical server, on which VMs are installed, including the first physical server and the second physical server, the VM deployment method including: calculating VM workload information, which is information related to VM workloads corresponding to loads on the physical servers imposed by the VMs installed on the physical servers, according to a predetermined workload calculation method on the basis of information related to operation of the first physical server and the second physical server, calculating initially predicted virtual load information which is information related to an initially predicted virtual load associated with loads on the physical servers predicted to be imposed by the VMs during a predetermined first time period on the basis of the VM workloads, calculating deployment schedule information, which is information related to a deployment schedule of the VMs on the first physical server and the second physical server, according to a first predetermined machine deployment calculation method, and migrating and deploying the VMs on the first physical server and the second physical server so that the VMs are deployed on the first physical server and the second physical server according to the deployment schedule calculated by the first predetermined machine deployment calculation method. The first predetermined machine deployment calculation method may be a method of calculating the deployment schedule of the VMs to minimize an objective function value on the basis of the initially predicted virtual load information.

The objective function may include a first objective function which is a function related to a load variation of a physical server calculated with the initially predicted virtual load during the predetermined first time period.

The objective function may include a second objective function which is a function related to a difference between loads on physical servers calculated with the initially predicted virtual load during the predetermined first time period.

The objective function may include a third objective function which is a function related to the number of times that the VMs are migrated on the first physical server and the second physical server to be deployed according to the deployment schedule.

The objective function may include a fourth objective function which is a function related to whether the first physical server operates during the predetermined first time period and whether the second physical server operates during the predetermined first time period.

The objective function may include a first objective function which is a function related to a load variation of a physical server calculated with the initially predicted virtual load during the predetermined first time period, a second objective function which is a function related to a difference between loads on physical servers calculated with the initially predicted virtual load during the predetermined first time period, a third objective function which is a function related to the number of times that the VMs are migrated on the first physical server and the second physical server to be deployed according to the deployment schedule, and a fourth objective function which is a function related to whether the first physical server operates during the during the predetermined first time period.

The deployment schedule may include a first deployment schedule which is a deployment of the VMs on the first physical server and the second physical server for minimizing a value of the second objective function, a value of the third objective function, and a value of the fourth objective function when the first objective function has a minimum value, a second deployment schedule which is a deployment of the VMs on the first physical server and the second physical server for minimizing a value of the first objective function, the value of the third objective function, and the value of the fourth objective function when the second objective function has a minimum value, a third deployment schedule which is a deployment of the VMs on the first physical server and the second physical server for minimizing the value of the first objective function, the value of the second objective function, and the value of the fourth objective function when the third objective function has a minimum value, and a fourth deployment schedule which is a deployment of the VMs on the first physical server and the second physical server for minimizing the value of the first objective function, the value of the second objective function, and the value of the third objective function when the fourth objective function has a minimum value.

The predetermined workload calculation method may include a method of calculating the VM workload information on the basis of only the degree of operation of a central processing unit (CPU).

The first predetermined machine deployment calculation method may include a method of calculating the deployment schedule of the VMs so that a load may be assigned to an arbitrary physical server only within a predetermined range.

The first predetermined machine deployment calculation method may include a method of moving at least one of VMs deployed on the arbitrary physical server to another physical server so that a load may be assigned to the arbitrary physical server only within the predetermined range when a load on the arbitrary physical server is predicted to be a first reference or more.

The first predetermined machine deployment calculation method may include a method of moving all VMs deployed on the arbitrary physical server to another physical server so that a load may be assigned to the arbitrary physical server only within the predetermined range when a load on the arbitrary physical server is predicted to be a second reference or less.

The first predetermined machine deployment calculation method may include a method of calculating the deployment schedule information so that an operating physical server may not be switched to a non-operating state due to migration of a VM which causes a non-operating physical server to operate.

The VM deployment method may further include determining, when the VMs are deployed on the first physical server and the second physical server according to the deployment schedule, whether selectively predicted virtual load information, which is information related to a selectively predicted virtual load associated with predicted loads on the physical servers, is calculated normally according to a predetermined check method on the basis of the selectively predicted virtual load information and actual virtual workload information which is information related to an actual workload corresponding to a load actually imposed on the physical servers by the VMs.

The predetermined check method may be a method of determining that the selectively predicted virtual load is calculated inaccurately when a difference between the actual workload of the VMs and the selectively predicted virtual load information corresponding thereto is a certain value or more.

According to another aspect of the present invention, there is provided a VM deployment device for implementing a VM deployment method of deploying a plurality of VMs on a first physical server and a second physical server to efficiently run a physical server, on which VMs are installed, including the first physical server and the second physical server, the VM deployment device including: a processor and a storage configured to store a program for performing the VM deployment method. The VM deployment method includes calculating VM workload information, which is information related to VM workloads corresponding to loads on the physical servers imposed by the VMs installed on the physical servers, according to a predetermined workload calculation method on the basis of information related to operation of the first physical server and the second physical server, calculating initially predicted virtual load information which is information related to an initially predicted virtual load associated with loads on the physical servers predicted to be imposed by the VMs during a predetermined first time period on the basis of the VM workloads, calculating deployment schedule information, which is information related to a deployment schedule of the VMs on the first physical server and the second physical server, according to a first predetermined machine deployment calculation method, and migrating and deploying the VMs on the first physical server and the second physical server so that the VMs are deployed on the first physical server and the second physical server according to the deployment schedule calculated by the first predetermined machine deployment calculation method. The first predetermined machine deployment calculation method may be a method of calculating the deployment schedule of the VMs to minimize an objective function value on the basis of the initially predicted virtual load information.

According to another aspect of the present invention, there is provided a VM deployment simulation method of simulating a change in deployment of VMs deployed on physical servers including a first physical server and a second physical server physically separated from the first physical server, the VM deployment simulation method including: calculating observed state information which is information related to states of the first physical server and the second physical server during a first time period and calculated on the basis of information that is stored in a storage and related to operation of the first physical server and the second physical server, calculating selected deployment information related to a selected deployment which is a deployment selected as a new deployment of the VMs on the first physical server and the second physical server, and calculating comparative information on the basis of the observed state information and predicted state information, which is information related to states of the first physical server and the second physical server during a second time period and calculated on the basis of the information that is stored in the storage and related to operation of the first physical server and the second physical server, to compare a case in which the VMs are deployed in the selected deployment selected on the basis of the predicted state information with a case in which the VMs are deployed in a past deployment corresponding to a deployment of the VMs which is a base of the observed state information.

The observed state information may include at least one of observed occupancy information which is information related to loads on the physical servers imposed by the VMs during the first time period, observed violation information which is information related to whether a predetermined reference is violated when the VMs run on the physical servers during the first time period, observed idle state information which is information related to a time in which the physical servers do not operate because the VMs are not deployed on the physical servers during the first time period, and observed migration information which is information related to the number of times that the VMs are migrated during the first time period, and the predicted state information may include at least one of predicted occupancy information which is information related to loads on the physical servers predicted to be imposed by the VMs during the second time period, predicted violation information which is information related to whether the predetermined reference is violated when the VMs are assumed to run in an arbitrary deployment on the physical servers during the second time period, predicted idle state information which is information related to a time in which the physical servers do not operate because the VMs are not deployed on the physical servers during the second time period, and predicted migration information which is information related to the number of times that the VMs are migrated during the second time period.

The VM deployment simulation method may further include calculating economic efficiency information which is information related to economic benefit acquired when the VMs are deployed in the selected deployment in relation to a case in which the VMs are deployed in the past deployment.

The economic efficiency information may be calculated on the basis of the observed idle state information and the predicted idle state information.

The VM deployment simulation method may further include calculating initially predicted virtual load information, which is information related to an initially predicted virtual load associated with the loads on the physical servers predicted to be imposed by the VMs during the second time period, using the information stored in the storage and related to operation of the first physical server and the second physical server according to a predetermined prediction method.

The VM deployment simulation method may further include calculating machine deployment information, which is information related to a machine deployment corresponding to a deployment of the VMs on the first physical server and the second physical server calculated according to a predetermined machine deployment calculation method, and the predetermined machine deployment calculation method may be a method of calculating a plurality of machine deployments, which are deployments of the VMs when values of a plurality of objective functions are minimized, on the basis of the initially predicted virtual load information. The selected deployment may be one of the machine deployments.

The VM deployment simulation method may further include calculating candidate predicted state information which is information related to a value within a range of a maximum to a minimum of predicted state values calculated on the basis of a plurality of pieces of predicted state information and displaying the predicted state value and a candidate predicted state value calculated on the basis of the candidate predicted state information according to a predetermined display method. The predetermined display method may be a method of displaying the predicted state value and a candidate predicted state value as a certain range.

BRIEF DESCRIPTION OF THE DRAWINGS

The above and other objects, characteristics and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. However, the spirit of the present invention is not limited to the embodiments set forth herein. Those of ordinary skill in the art can easily propose other embodiments included in the scope of a regressive invention or the present invention by adding, changing, removing, etc. elements within the scope of the present invention, but the embodiments also fall within the scope of the present invention.

Throughout the drawings of embodiments, elements having the same functionality within the same spirit will be indicated by the same reference signs.

Figure 1:
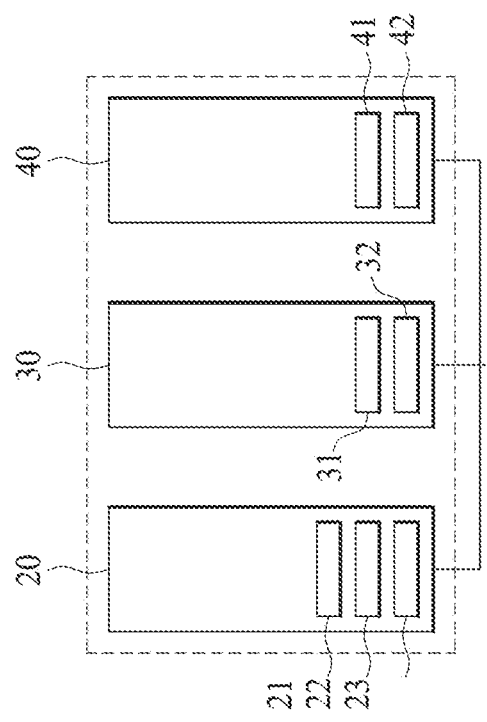
FIG. 1 shows a conceptual diagram of a virtual machine (VM) management system according to an exemplary embodiment of the present invention and a diagram illustrating the relationship between the VM management system and physical servers.
Figure 1:
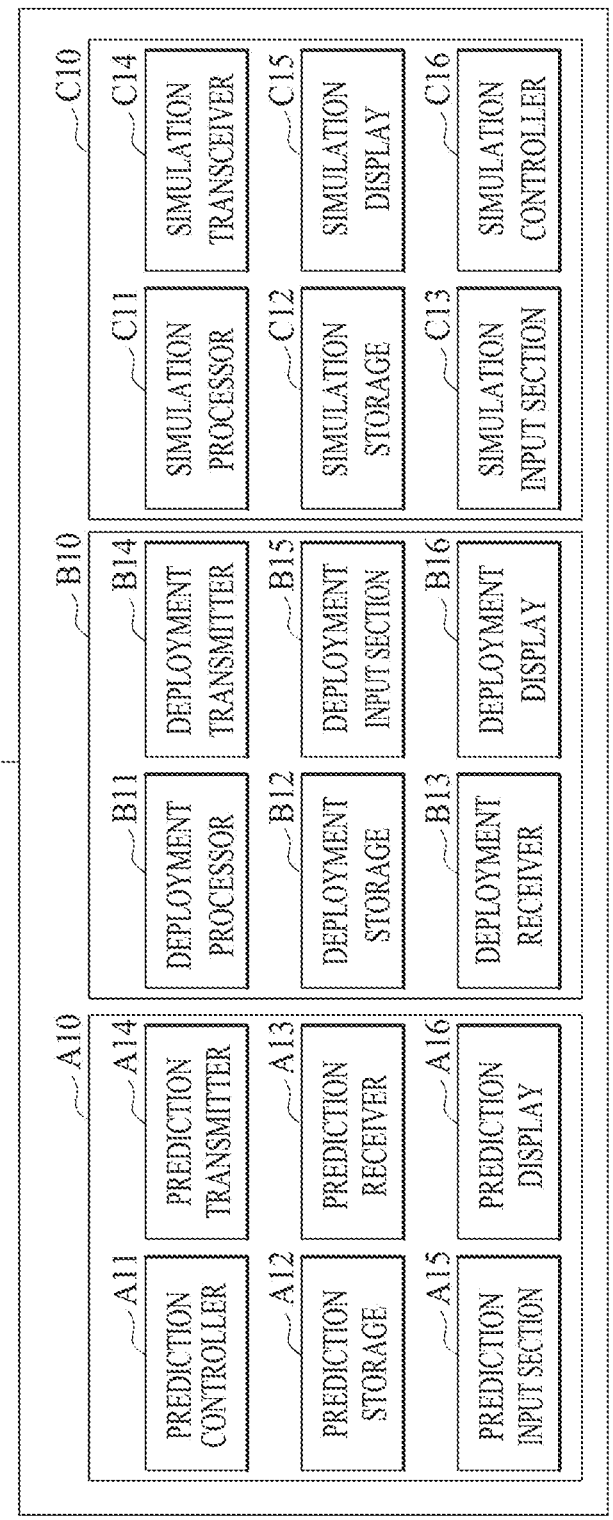

FIG. 1 shows a conceptual diagram of a virtual machine (VM) management system according to an exemplary embodiment of the present invention and a diagram illustrating the relationship between the VM management system and physical servers.

The VM management system according to the exemplary embodiment of the present invention may include a prediction device A10, a VM deployment device B10, and a VM deployment simulation device C10.

The VM management system may control, regulate, and manage physical servers.

The physical servers may indicate hardware platforms on which VMs may be executed.

For example, the physical servers may be general desktop computers, server computers, laptop computers, mobile phones, or the like.

However, the physical servers are not limited thereto and may be any system on which VMs may be executed.

The physical servers may include a first physical server to an $n^{th}$ physical server (n is a natural number which is greater than or equal to two).

Referring to FIG. 1, the physical servers include a first physical server 20, a second physical server 30, and a third physical server 40. On the first physical server 20, a first VM 21, a second VM 22, and a third VM 23 may be run. On the second physical server 30, a fourth VM 31 and a fifth VM 32 may be run. On the third physical server 40, a sixth VM 41 and a seventh VM 42 may be run.

One example is shown in FIG. 1, and the number of physical servers or the deployment of VMs may be variously changed within a range self-evident to those of ordinary skill in the art.

In the following description, it is assumed that the VM management system controls, regulates, and manages the first physical server 20, the second physical server 30, and the third physical server 40.

The VM management system may perform a VM management method.

The VM management system may include a Prediction Device, a VM Deployment Device and a VM Deployment Simulation Device.

The VM management method may include a VM workload prediction method, a VM deployment method based on scheduling, and a VM deployment simulation method.

Each device and the VM management method will be described in detail below.

1. VM Workload Prediction Method and Prediction Device for Implementing the Same Referring to FIG. 1, the prediction device A10 according to the exemplary embodiment of the present invention may include a prediction controller A11 for computing, calculating, and/or processing information (e.g., data) required for implementing the VM workload prediction method, a prediction storage A12 for storing the information required for implementing the VM workload prediction method, a prediction receiver A13 for receiving certain information, and a prediction transmitter A14 for transmitting certain information.

The prediction device A10 may further include a prediction display A16 for displaying an image under the control of the prediction controller A11 and a prediction input section A15 for transferring a certain signal generated by an external input to the prediction controller A11, the prediction storage A12, the prediction transmitter A14, the prediction receiver A13, and/or the prediction display A16.

The prediction controller A11 may perform computations, such as processing all information required for implementing the VM workload prediction method, on the basis of the information stored in the prediction storage A12.

For example, the prediction controller A11 may indicate a central processing unit (CPU).

However, the prediction controller A11 is not limited thereto and may include any device or part which may perform computations required for implementing the VM workload prediction method.

In the prediction storage A12, information (data) required for implementing the VM workload prediction method may be stored.

For example, storage load information to be described below may be stored in the prediction storage A12.

A program for performing the VM workload prediction method may be stored in the prediction storage A12.

As an example, the prediction storage A12 may be a hard disk as an auxiliary storage device.

However, the prediction storage A12 is not limited thereto and may include any element in which information required for implementing the VM workload prediction method may be stored.

The prediction receiver A13 may receive and transfer certain information to the prediction controller A11, the prediction storage A12, the prediction input section A15, the prediction display A16, and/or the prediction transmitter A14.

For example, the prediction receiver A13 may receive information transferred from a physical server.

The prediction receiver A13 may receive information related to operation of the physical server from the physical server.

For example, the prediction receiver A13 may receive and transfer storage load information which will be described below to the prediction storage A12.

The prediction transmitter A14 may transmit certain information to an arbitrary device or server.

For example, the prediction transmitter A14 may transfer the information to the physical server.

The prediction transmitter A14 may transfer a control signal calculated by the prediction controller A11 to the physical server.

For example, the prediction input section A15 may be a keyboard.

However, the prediction input section A15 is not limited thereto, and the type of prediction input section A15 may be varied within a range self-evident to those of ordinary skill in the art.

For example, the prediction display A16 may be a display.

However, the prediction display A16 is not limited thereto, and the type of prediction display A16 may be varied within a range self-evident to those of ordinary skill in the art.

The elements in the prediction device A10 may be connected to each other in a wired and/or wireless manner.

The prediction device A10 may be connected to each of the physical servers in a wired and/or wireless manner.

Main characteristics of the VM workload prediction method implemented by the prediction device will be described below.

Figure 2:
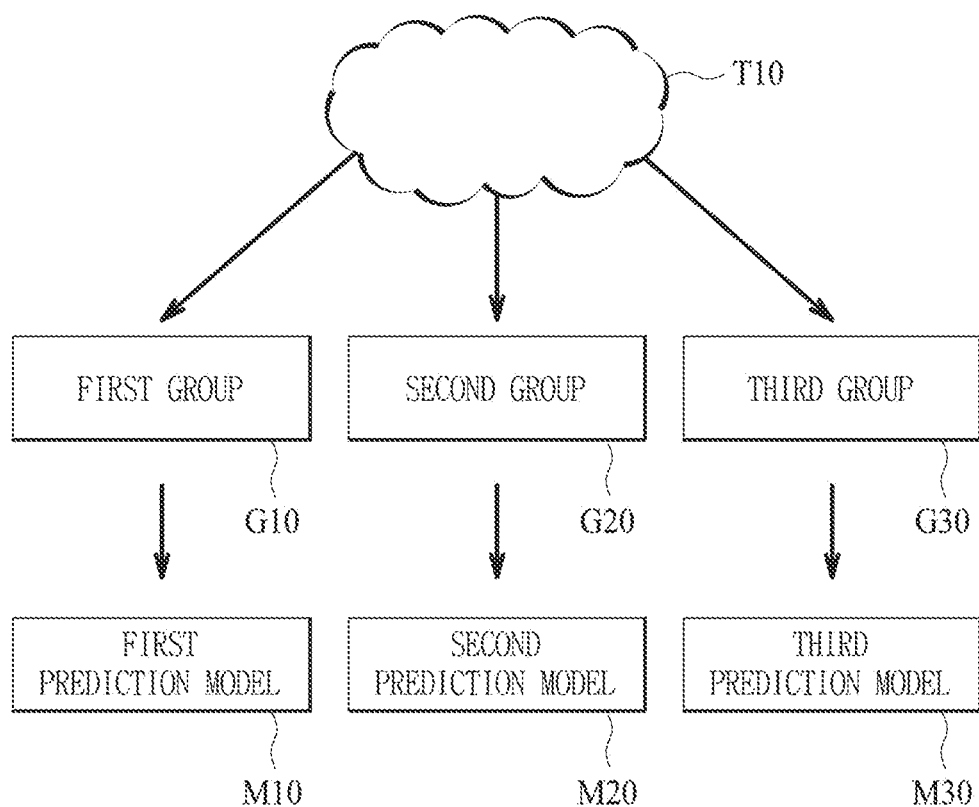
FIG. 2 is a conceptual diagram schematically illustrating a VM workload prediction method according to an exemplary embodiment of the present invention.

FIG. 2 is a conceptual diagram schematically illustrating a VM workload prediction method according to an exemplary embodiment of the present invention.

The receiver (prediction receiver) may receive information related to VMs running on physical servers and transfer the received information to the storage.

The controller (prediction controller) may calculate storage load information (VM workload information) according to a predetermined workload calculation method on the basis of the information related to VMs running on physical servers.

The storage load information may indicate information on storage loads which are loads on physical servers imposed by VMs.

The storage load information may be stored in the storage (prediction storage).

For example, the predetermined workload calculation method may be a method of calculating storage load information on the basis of the degree of operation of the CPU (CPU utilization) of a physical server resulting from running VMs.

In other words, the degree of operation of the CPU of a physical server resulting from running VMs may denote a storage load.

In the predetermined workload calculation method, it may be assumed that one VM is executed on only one physical server.

For example, this may denote that one VM is not implemented on two physical servers.

A physical server workload may indicate a load assigned to a physical server.

For example, the physical server workload may be calculated as a load assigned to a CPU of the physical server.

For example, the physical server workload may be calculated by adding loads on the physical server caused by VMs deployed on the physical server.

In this way, basic data required for prediction is simplified so that the accuracy of prediction in an operation to be described below may be further increased.

A VM workload may indicate a physical server load caused by a VM running on a physical server.

On the basis of storage loads stored in the storage, the controller may calculate a prediction model for calculating a predicted load, which will be described below, using an algorithm, such as a multiple regression model, autoregressive integrated moving average (ARIMA) analysis, or deep learning.

A machine learning algorithm for generating a prediction model is a technique well known to those of ordinary skill in the art, and thus the detailed description thereof is omitted.

When all storage load information is input and then one prediction model is generated through machine learning, the accuracy of prediction may be reduced, and a time period for model forming may be slightly increased.

To prevent this, before a prediction model is generated, storage load information may be classified by a predetermined classification method so that storage load information of similar characteristics may be classified into one group.

As an example, referring to FIG. 2, a storage load T10 may be classified into a first group G10, a second group G20, and a third group G30.

For the first group G10, the controller may produce a first prediction model M10 for predicting a load on a physical server expected to be caused by a VM through machine learning.

Likewise, for the second group G20, the controller may produce a second prediction model M20 for predicting a load on a physical server expected to be caused by a VM through machine learning.

Also, for the third group G30, the controller may produce a third prediction model M30 for predicting a load on a physical server expected to be caused by a VM through machine learning.

As described above, prediction models are separately generated and used on the basis of storage loads having similar characteristics or patterns. Therefore, it is possible to increase the accuracy of prediction and drastically reduce an analysis time.

FIG. 2 has been described on the assumption that storage loads are classified into three groups. However, the present invention is not limited thereto, and the classified types of groups may be varied within a range self-evident to those of ordinary skill in the art.

The VM workload prediction method implemented by the prediction device will be described in detail below.

Figure 3:
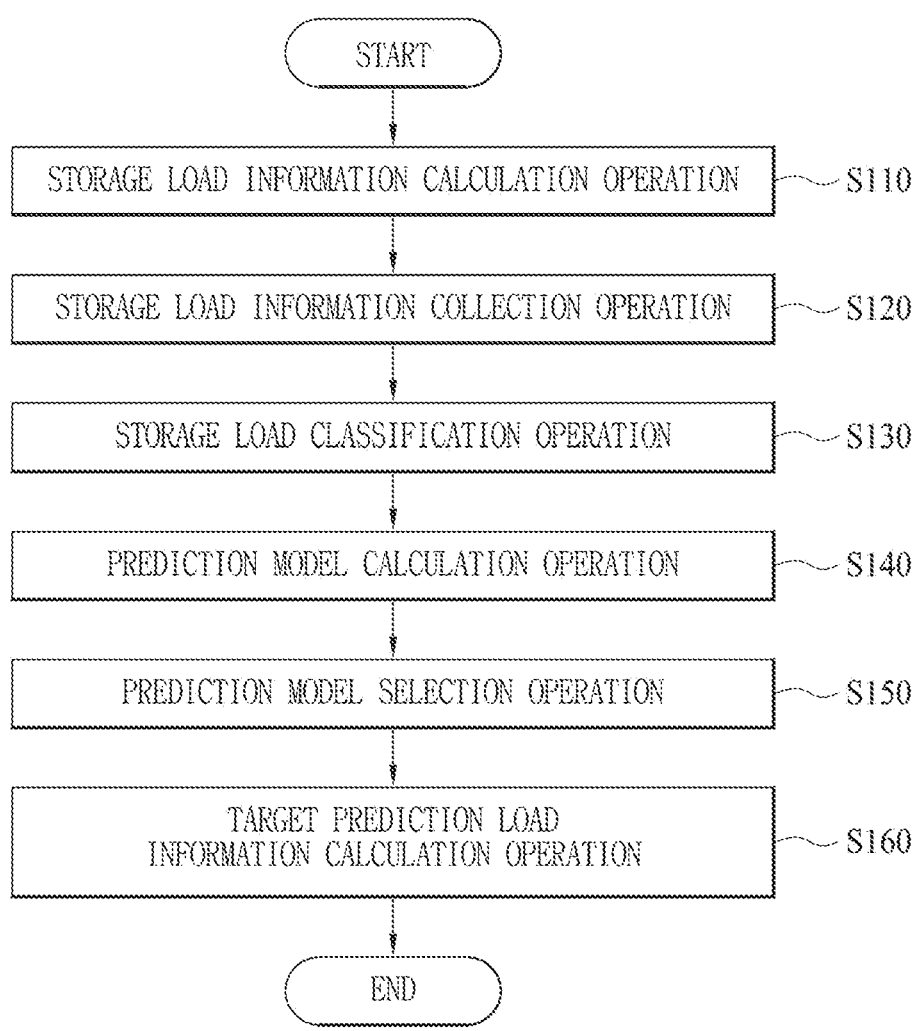
FIG. 3 is a flowchart of the VM workload prediction method according to the exemplary embodiment of the present invention.

FIG. 3 is a flowchart of the VM workload prediction method according to the exemplary embodiment of the present invention.

Referring to FIG. 3, the VM workload prediction method according to the exemplary embodiment of the present invention is implemented by the prediction device to calculate a prediction load, which is a load on a physical server predicted to be imposed by a plurality of VMs installed on the physical server. The VM workload prediction method includes an operation S120 of collecting storage load information which is information related to a storage load corresponding to a load on a physical server caused by the VMs installed on the physical server, an operation S130 of classifying storage loads of the VMs into groups by a predetermined classification method, an operation S140 of forming, when the storage loads are arranged on the basis of a certain reference, a prediction model for calculating a prediction load through deep learning based on the storage loads from storage loads classified into each group, an operation S150 of selecting at least one of a plurality of prediction models by a predetermined selection method to increase prediction accuracy of a target prediction load which is a load on the physical server predicted to be caused by the target VM to be analyzed, and an operation S160 of calculating target prediction load information which is information related to the target prediction load according to a predetermined calculation method on the basis of target storage load information, which is information related to a target storage load corresponding to a load on the physical server caused by the target VM, and a selection model which is the selected prediction model.

The controller may calculate the storage load information on the basis of information stored in the storage according to the predetermined workload calculation method (S110).

Alternatively, the receiver may receive and transfer the storage load information to the storage, and the storage may store the storage load information.

The controller may collect the storage load information stored in the storage (S120).

The controller may classify the collected storage load information by the predetermined classification method (S130).

The predetermined classification method may be a method of arranging the storage loads on the basis of a certain arrangement reference.

Figure 4:
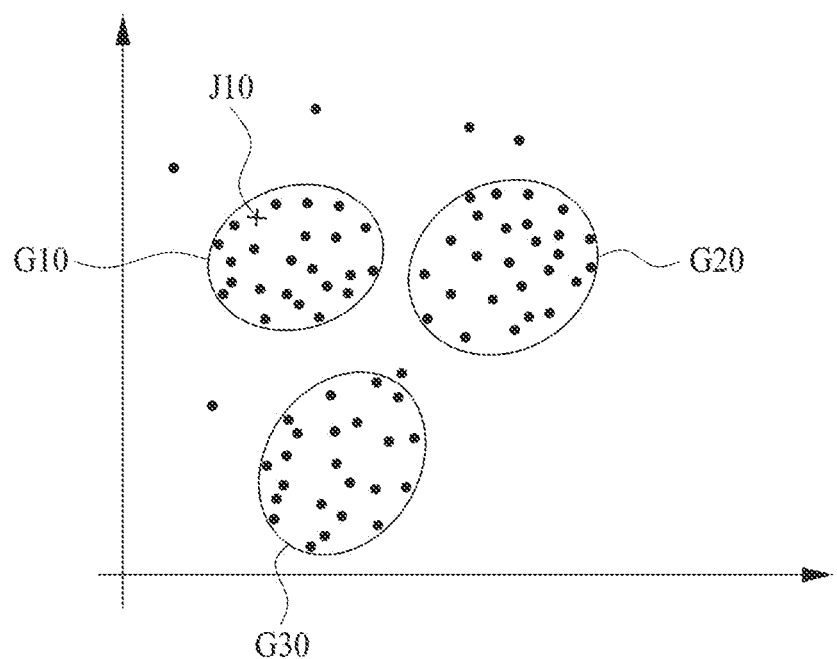
FIG. 4 is a diagram illustrating a storage load classification operation and a prediction model selection operation in the VM workload prediction method according to the exemplary embodiment of the present invention.

FIG. 4 is a diagram illustrating a storage load classification operation and a prediction model selection operation in the VM workload prediction method according to the exemplary embodiment of the present invention.

The controller may arrange the storage load information according to the predetermined classification method.

For example, the arrangement reference may be a reference related to the length of a task time and change rates of storage loads during the task time.

For example, referring to FIG. 4, the x-axis may denote the length of a task time, and the y-axis may denote the average of change rates of storage loads during the task time.

A time period in which the workload of a VM is a certain value or more may be defined as a task time.

However, the present invention is not limited to the example of an arrangement reference, and the arrangement reference may be variously changed according to the purpose of use, the environment of use, and the like within a range self-evident to those of ordinary skill in the art.

According to the predetermined classification method, the controller may calculate the storage load information with respect to the arrangement reference and then calculate coordinates of one point on a graph based on the arrangement reference.

In other words, arrangement based on an arrangement reference may be for calculating an arrangement reference for storage loads and calculating positions (coordinates) of the storage loads on a graph on the basis of the arrangement reference.

The controller may classify the storage loads which are arranged on the basis of the arrangement reference into groups by a reference classification method.

As an example, the reference classification method may be a method of grouping pieces of storage load information through K-means clustering.

K-means clustering is well known to those of ordinary skill in the art, and thus the detailed description thereof is omitted.

When the reference classification method is a grouping method based on K-means clustering, the number of groups for classification may be stored in advance in the controller or the storage.

Alternatively, the number of groups for classification may be input from a user through the input section (prediction input section).

As another example, the reference classification method may be a method of grouping pieces of storage load information through hierarchical clustering.

Hierarchical clustering is well known to those of ordinary skill in the art, and thus the detailed description thereof is omitted.

When the reference classification method is a grouping method based on hierarchical clustering, the number of groups for classification may be likewise stored in advance in the controller or the storage.

Alternatively, the number of groups for classification may be input from the user through the input section.

The reference classification method will be described below on the assumption that pieces of storage load information are grouped through hierarchical clustering, but the present invention is not limited thereto.

Referring to FIG. 4, the controller may arrange the storage loads according to the predetermined classification method.

For example, when a predetermined number of groups is three, the controller may classify the storage loads into three groups (the first group G10, the second group G20, and the third group G30).

In this case, pieces of storage load information may not be included in any group.

When the storage loads are arranged on the basis of the certain arrangement reference, the controller may produce a prediction model for calculating a prediction load on the basis of the storage load information from storage loads classified into each group.

For example, the controller may perform machine learning with the storage loads of each group to produce each prediction model for predicting a future VM workload.

For example, when the number of groups is three, three prediction models may be produced.

As an example, a prediction model produced by performing machine learning with storage load information included in the first group G10 may be referred to as a first prediction model.

As another example, a prediction model produced by performing machine learning with storage load information included in the second group G20 may be referred to as a second prediction model.

As another example, a prediction model produced by performing machine learning with storage load information included in the third group G30 may be referred to as a third prediction model.

After prediction models are produced, a future load of an arbitrary VM may be predicted.

A target VM may indicate a VM to be analyzed.

When a target VM is selected, the controller may calculate target storage load information according to the predetermined workload calculation method on the basis of information which is stored in the storage and related to an operation of a physical server caused by the target VM.

The target storage load may indicate a load on the physical server caused by the target VM, and the target storage load information may indicate information related to the target storage load.

The controller may select at least one of a plurality of prediction models on the basis of the calculated target load information according to the predetermined selection method.

The predetermined selection method may include a first selection method of selecting, when the target storage load is located in a group of storage loads after the target storage load is arranged on the basis of the arrangement reference, a prediction model produced on the basis of the storage loads classified into the group in which the target storage load is located as the selection model.

In other words, a prediction model produced on the basis of storage load information corresponding to the group may be selected as the selection model.

When the target storage load is located in a group of storage loads after the target storage load is arranged on the basis of the arrangement reference, one prediction model may be selected as the selection model.

As a specific example, referring to FIG. 4, when the target storage load is arranged on the basis of the arrangement reference, the target storage load may be located in a group J10. Assuming that the target storage load is located in the first group G10, the first prediction model may be selected as the selection model.

Figure 5:
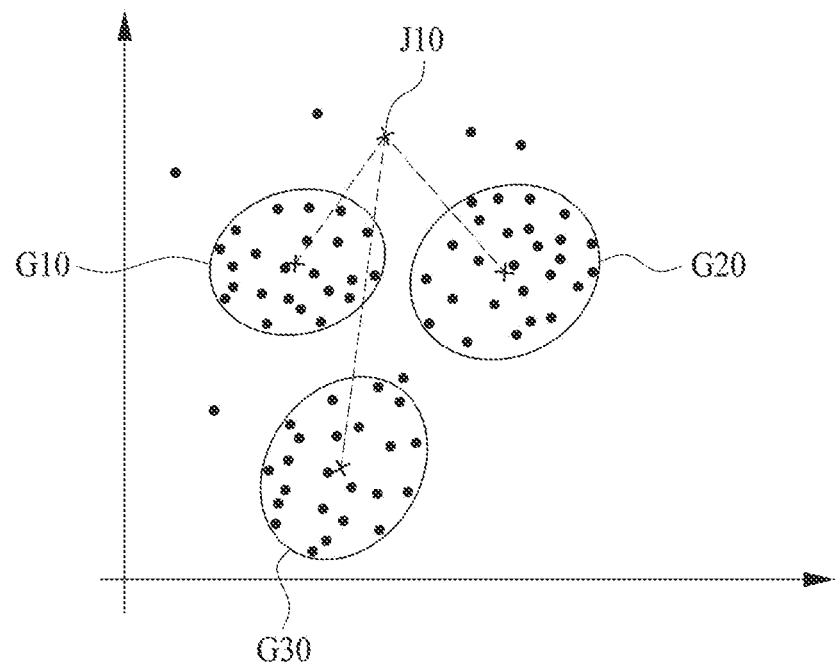
FIG. 5 is a diagram illustrating the prediction model selection operation in the VM workload prediction method according to the exemplary embodiment of the present invention.

FIG. 5 is a diagram illustrating the prediction model selection operation in the VM workload prediction method according to the exemplary embodiment of the present invention.

The predetermined selection method may further include a second selection method of selecting, when the target storage load is not located in any group of storage loads after the target storage load is arranged on the basis of the arrangement reference, prediction models corresponding to groups of storage loads satisfying a predetermined condition as the selection model.

As an exemplary embodiment of the present invention, the predetermined condition may require the group to be located within a certain distance from the target storage load when the target storage load is arranged on the basis of the arrangement reference.

As another exemplary embodiment of the present invention, the predetermined condition may require the group to be located within a reference range from a reference distance which is the shortest one of distances from the target storage load to the groups of storage loads when the target storage load is arranged on the basis of the arrangement reference.

Specifically, referring to FIG. 5, when the storage loads are classified by the predetermined classification method, it may be assumed that the storage loads are classified into the first group G10, the second group G20, and the third group G30.

The target storage load may be arranged on the basis of the arrangement reference by the controller.

For example, the distance between a position J10 of the target storage load and the first group G10 may be 1, the distance between the position J10 of the target storage load and the second group G20 may be 1.5, and the distance between the position J10 of the target storage load and the third group G30 may be 2.

Under the predetermined condition according to an exemplary embodiment of the present invention, the first prediction model and the second prediction model may be selected as the selection model because the first prediction model and the second prediction model correspond to the first group G10 and the second group G20 present within the certain distance (e.g., 1.7) from the target storage load.

Alternatively, under the predetermined condition according to another exemplary embodiment of the present invention, the first prediction model and the second prediction model may be selected as the selection model because the first prediction model and the second prediction model correspond to the first group G10 and the second group G20 present within a reference range (e.g., 0.7) from a reference distance (in the example, 1) which is the shortest one of distances from the target storage load to the storage load groups.

The above example has been described on the assumption that the distance between a target storage load and a group is the distance from the position of the target storage load and the center of the group.

However, the present invention is not limited thereto, and the method of calculating the distance between a target storage load and a group may be changed. The method of calculating the distance between an entity and a group is self-evident to those of ordinary skill in the art, and thus the detailed description thereof is omitted.

The controller may calculate target prediction load information related to the target prediction load on the basis of the selection model and the target storage load information according to the predetermined calculation method.

The predetermined calculation method may be a method of calculating the target prediction load information in different ways depending on whether the selection model is singular or plural.

Specifically, the predetermined calculation method may be a method of calculating the target prediction load information by inputting the target storage load information to the selection model when the selection model is singular.

Also, the predetermined calculation method may be a method of calculating, when the selection model has a plurality of selection models, the target prediction load information by considering weights, which are calculated on the basis of a ratio of separation distances from the target storage load to storage load groups corresponding to the selection models after the target storage load is arranged on the basis of the arrangement reference.

Specifically, when the selection model has a plurality of selection models, the target storage load information may be input to each selection model.

When the target storage load information is input to the selection model, the controller may calculate a plurality of pieces of target preliminary load information related to a plurality of target preliminary loads as a result value.

The target preliminary loads may indicate a predicted load of the target VM on a physical server which is calculated by inputting the target storage load information to one prediction model among the selection models.

Also, the controller may calculate weights on the basis of distances between the target storage load and the selection models.

The controller may calculate the target prediction load information by merging the target preliminary loads on the basis of the weights.

The greater the distance between the target storage load and the selection model, the smaller the weight.

The smaller the distance between the target storage load and the selection model, the larger the weight.

As an example, referring to FIG. 4, when only the first prediction model is selected as the selection model, the target storage load information is input only to the first prediction model according to the predetermined calculation method so that the target prediction load information may be calculated.

As another example, referring to FIG. 5, when the first prediction model and the second prediction model are selected as the selection model, the target storage load information is input to each of the first prediction model and the second prediction model according to the predetermined calculation method so that the target preliminary load information related to target preliminary loads may be calculated.

For example, the target storage load information may be input to the first prediction model so that first target preliminary load information related to a first target preliminary load, which is a target preliminary load related to the first prediction model, may be calculated.

For example, the target storage load information may be input to the second prediction model so that second target preliminary load information related to a second target preliminary load, which is a target preliminary load related to the second prediction model, may be calculated.

The controller may merge the first target preliminary load and the second target preliminary load on the basis of the first target preliminary load information and the second target preliminary load information.

In this case, boosting or bagging may be used as a merging method.

These techniques are well known to those of ordinary skill in the art, and the detailed description thereof is omitted.

Since the first group is closer to the position of the target storage load than the second group, the first target preliminary load information may have a higher weight than the second target preliminary load information when merged with the second target preliminary load information.

Figure 6:
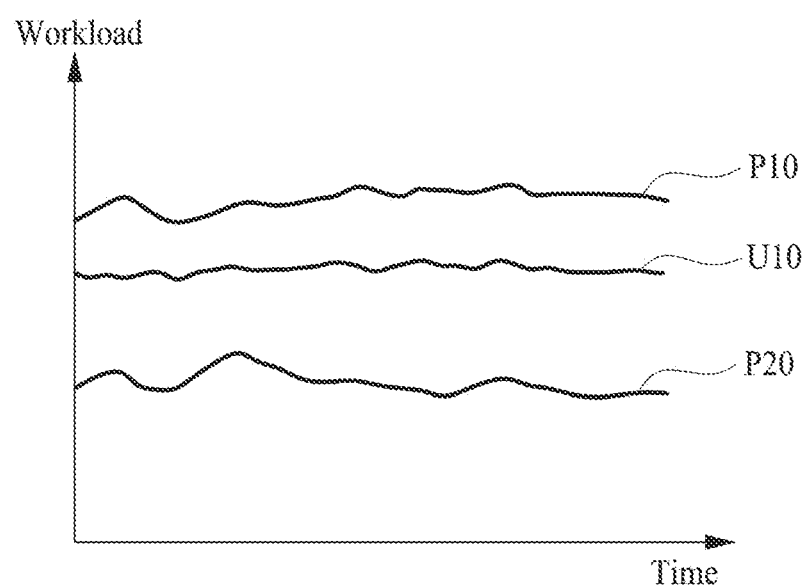
FIG. 6 is a diagram illustrating a target prediction load information calculation operation in the VM workload prediction method according to the exemplary embodiment of the present invention.

FIG. 6 is a diagram illustrating a target prediction load information calculation operation in the VM workload prediction method according to the exemplary embodiment of the present invention.

As a specific example, a first target preliminary load P10 and a second target preliminary load P20 may be calculated as shown in the graph of FIG. 6.

The first group is closer to the position of the target storage load than the second group. Therefore, when the first target preliminary load P10 and the second target preliminary load P20 are merged, a target prediction load U10 may be calculated to be biased toward the first target preliminary load P10.

As described above, a greater weight is given to a target preliminary load resulting from a closer group, and thus prediction accuracy can be further increased.

The predetermined calculation method may further include a method of calculating target preliminary load information of a certain time period.

The predetermined calculation method may calculate a workload of a VM for each time period.

Accordingly, it is possible to readily predict a future workload and easily find a solution for managing a data center thereafter.

The controller may calculate target prediction load information of all VMs present in the physical servers.

The user may migrate VMs on the basis of future workloads of VMs to prevent the physical servers from being overloaded and to efficiently run the physical servers.

A target VM may be one VM on the above-described physical servers or an external VM which is wanted to be analyzed.

2. VM Deployment Method Based on Scheduling and VM Deployment Device for Implementing the Same Referring to FIG. 1, the VM deployment device B10 according to the exemplary embodiment of the present invention may include a deployment processor B11 for processing information (e.g., data) required for deploying and arranging VMs, a deployment storage B12 for storing the information required for deploying and arranging VMs, a deployment receiver B13 for receiving the information required for deploying and arranging VMs, and a deployment transmitter B14 for transmitting the information required for deploying and arranging VMs.

Also, the VM deployment device B10 may further include a deployment input section B15 for transferring information generated by external inputs to the deployment receiver B13 and a deployment display B16 for displaying a deployment schedule, which will be describe below, to notify the user of the deployment schedule.

The deployment processor B11 may perform computations, such as processing all information required for implementing the VM deployment method, on the basis of the information stored in the storage (deployment storage).

For example, the deployment processor B11 may indicate a CPU.

However, the deployment processor B11 is not limited thereto and may include any device or part which may perform computations required for implementing the VM deployment method.

In the deployment storage B12, information (data) required for implementing the VM deployment method may be stored.

A program for performing the VM deployment method may be stored in the deployment storage B12.

For example, the deployment storage B12 may be a hard disk as an auxiliary storage device.

However, the deployment storage B12 is not limited thereto and may include any element in which information required for implementing the VM deployment method may be stored.

For example, the deployment storage B12 may be a database.

The deployment receiver B13 may receive information from a physical server.

The deployment receiver B13 may receive information related to operation of the physical server from the physical server.

The deployment transmitter B14 may transmit information to the physical server.

The deployment transmitter B14 may transfer a control signal calculated by the deployment processor B11 to the physical server.

Accordingly, the VM deployment device B10 may transfer a control signal to each physical server so that a VM running on one physical server may be migrated to another physical server.

For example, the deployment input section B15 may be a keyboard.

However, the deployment input section B15 is not limited thereto, and the type of deployment input section B15 may be varied within a range self-evident to those of ordinary skill in the art.

For example, the deployment display B16 may be a display.

However, the deployment display B16 is not limited thereto, and the type of deployment display B16 may be varied within a range self-evident to those of ordinary skill in the art.

The elements in the VM deployment device B10 may be connected to each other in a wired and/or wireless manner.

The VM deployment device B10 may be connected to each of the physical servers in a wired and/or wireless manner.

The VM deployment method implemented by the VM deployment device B10 will be described in detail below.

Figure 7:
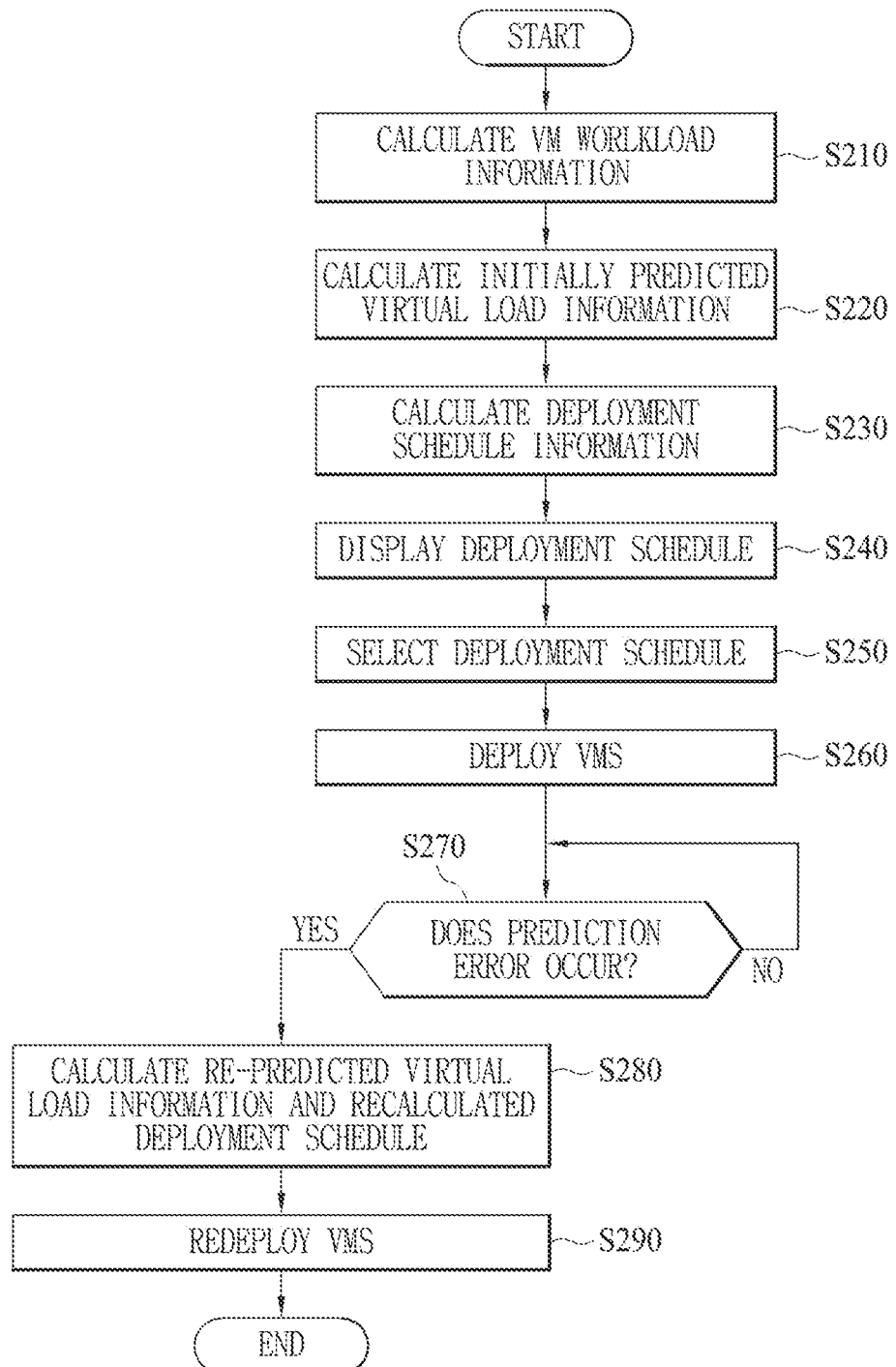
FIG. 7 is a flowchart of a VM deployment method which is a part of the VM management method according to an exemplary embodiment of the present invention.

FIG. 7 is a flowchart of a VM deployment method which is a part of the VM management method according to the exemplary embodiment of the present invention.

Referring to FIG. 7, the VM deployment method according to the exemplary embodiment of the present invention is a method of deploying a plurality of VMs on a first physical server and a second physical server to efficiently run a physical server, on which VMs are installed, including the first physical server and the second physical server. The VM deployment method includes an operation S210 of calculating VM workload information, which is information related to VM workloads corresponding to loads on the physical servers imposed by the VMs according to a predetermined workload calculation method on the basis of information related to operation of the first physical server and the second physical server, an operation S220 of calculating initially predicted virtual load information which is information related to an initially predicted virtual load associated with loads on the physical server predicted to be imposed by the VMs during a predetermined first time period on the basis of the VM workloads, an operation S230 of calculating deployment schedule information, which is information related to a deployment schedule of the VMs on the first physical server and the second physical server, according to a first predetermined machine deployment calculation method, and an operation S260 of migrating and deploying the VMs on the first physical server and the second physical server so that the VMs may be deployed on the first physical server and the second physical server according to the deployment schedule calculated by the first predetermined machine deployment calculation method.

The VM deployment method may further include an operation S240 of displaying a plurality of deployment schedules calculated according to the first predetermined machine deployment calculation method through the display.

The VM deployment method may further include an operation S250 of receiving a selected deployment schedule, which is one of the plurality of deployment schedules displayed through the display, through the input section (deployment input section) and transferring information related to the selected deployment schedule to the processor (deployment processor).

The VM deployment method may further include an operation S270 of determining, when the VMs are deployed on the first physical server and the second physical server according to the selected deployment schedule, whether selectively predicted virtual load information, which is information related to a selectively predicted virtual load associated with predicted loads on the physical servers, is calculated normally according to a predetermined check method on the basis of the selectively predicted virtual load information and actual virtual workload information which is information related to an actual workload of the VMs.

The storage may store information related to operation of the first physical server, information related to operation of the second physical server, and information related to operation of the third physical server, For example, the information related to operation of the first physical server, the second physical server, and the third physical server may be stored in the storage in a time-series manner.

To this end, the receiver (deployment receiver) may receive the information related to operation of each of the first physical server, the second physical server, and the third physical server.

For example, operation-related information may be information related to operating ratios of elements of a physical server.

The processor may calculate may calculate VM workload information, which is information related to VM workloads corresponding to loads on the physical servers imposed by the VMs according to a predetermined workload calculation method on the basis of information stored in the storage and related to operation of each of the physical servers (S210).

A VM workload may indicate a load on resources of a physical server when a VM is run on the physical server.

The VM workload may indicate a load assigned to the physical server when the VM is run on the physical server.

For example, the VM workload may be calculated as a load which is imposed on a CPU of the physical server by the VM running on the physical server.

Consequently, the predetermined workload calculation method may include a method of calculating a VM workload as a load assigned to a CPU of a physical server.

In other words, according to the predetermined workload calculation method, the VM workload information may be calculated on the basis of only the degree of operation of a CPU.

In the predetermined workload calculation method, it may be assumed that one VM is executed on only one physical server.

For example, this may denote that one VM is not implemented on two physical servers.

A physical server workload may indicate a load assigned to a physical server.

For example, the physical server workload may be calculated as a load assigned to a CPU of the physical server.

For example, the physical server workload may be calculated by adding loads on the physical server caused by VMs deployed on the physical server.

In this way, basic data which is described below and required for prediction is simplified so that the accuracy of prediction in an operation to be described below may be further increased.

The processor may calculate initially predicted virtual load information (target prediction load information) corresponding to information related to an initially predicted virtual load associated with loads on the physical servers predicted to be imposed by the VMs during the predetermined first time period, which is a future time period, from a reference time point on the basis of the VM workloads (S220).

For example, the reference time point may be a time point for VM workload information calculation.

However, the reference time point is not limited thereto and may be variously changed within a range self-evident to those of ordinary skill in the art.

To predict a load of a VM, the above-described VM workload prediction method may be used.

Therefore, the initially predicted virtual load information may indicate target prediction load information.

However, the initially predicted virtual load information is not limited thereto and may be calculated using a method other than the VM workload prediction method.

To calculate the initially predicted virtual load information, VM workload information, which is a workload of each of the VMs during the predetermined first time period, may be predicted.

Loads of the VMs corresponding to the predetermined first time period are predicted, and the VMs are redeployed on the basis of the predicted loads. This is because, when the VM are migrated on the basis of overload corresponding to a specific time point, the number of migrations is increased, and it is not possible to stabilize the overall physical servers.

Therefore, the above problem can be effectively solved by deploying VMs on physical servers on the basis of a specific time period rather than a specific time point in the future.

For example, the predetermined first time period may be three months.

However, the present invention is not limited thereto, and the predetermined first time period may be variously changed within a range self-evident to those of ordinary skill in the art.

For example, the processor may calculate VM workload information of the predetermined first time period using an algorithm, such as a multiple regression model, ARIMA analysis, or deep learning, on the basis of the VM workload information stored in the storage.

The processor may calculate a predicted workload on a physical server for the predetermined first time period on the basis of the VM workload information of the predetermined first time period.

This is a technique well-known to those of ordinary skill in the art, and the detailed description thereof is omitted.

For example, the initially predicted virtual load may indicate a workload of a VM predicted for the predetermined first time period from the time point for VM workload information calculation or the predetermined first time period from an arbitrary time point.

The processor may calculate deployment schedule information which is information related to deployment schedules of the VMs on the first physical server and the second physical server according to the first predetermined machine deployment calculation method (S230).

The first predetermined machine deployment calculation method may indicate a method of calculating a deployment schedule of the VMs to minimize the value of an objective function on the basis of the initially predicted virtual load information.

The first predetermined machine deployment calculation method may include a method of calculating a deployment schedule of the VMs so that a load may be assigned to an arbitrary physical server only within a predetermined range (first condition).

For example, the predetermined range may be an operating ratio of a physical server from 10% to 80%.

The operating ratio of a physical server means to the amount of assigned loads to the physical sever.

However, the predetermined range is not limited thereto and may be variously changed within a range self-evident to those of ordinary skill in the art.

The first predetermined machine deployment calculation method may include a method of moving at least one of VMs deployed on the arbitrary physical server to another physical server so that a load may be assigned to the arbitrary physical server only within the predetermined range when a load on the arbitrary physical server is predicted to be a first reference X10 (see FIGS. 8 and 9) or more (first-first condition).

For example, the first reference X10 (see FIGS. 8 and 9) may require the operating ratio of a physical server to be 80%.

The processor may calculate the deployment schedule using a method of migrating at least one VM deployed on the target physical server to another physical server at a time point at which a load on the target physical server is predicted to exceed the first reference as a solution for preventing a load on the physical server from exceeding the first reference.

Accordingly, it is possible to effectively prevent a load on the physical server from exceeding the first reference, that is, an overload on the physical server.

However, the first reference is not limited thereto and may be variously changed within a range self-evident to those of ordinary skill in the art.

Also, the first predetermined machine deployment calculation method may include a method of moving all VMs deployed on the arbitrary physical server to another physical server so that a load may be assigned to the arbitrary physical server only within the predetermined range when a load on the arbitrary physical server is predicted to be a second reference X20 (see FIGS. 8 and 9) or less (first-second condition).

For example, the second reference X20 (see FIGS. 8 and 9) may require the operating ratio of a physical server to be 10%.

The processor may calculate the deployment schedule using a method of migrating all VMs deployed on the target physical server to another physical server at a time point at which a load on the target physical server is predicted to be the second reference or less as a solution for preventing a load on the physical server from decreasing to the second reference or less.

This may denote a start condition for stopping operation of a physical server.

In other words, as a solution for preventing a load on the physical server from decreasing to the second reference or less, the processor may stop operation of the target physical server by migrating a VM deployed on the target physical server to another server.

The first predetermined machine deployment calculation method may include a method of calculating the deployment schedule information so that an operating physical server may not be switched to a non-operating state due to migration of a VM which causes a non-operating physical server to operate (second condition).

When one physical server starts operating as soon as another physical server is stopped, there is no benefit in stopping the other physical server, and rather, more power and time are consumed to operate the server.

Therefore, such a problem may be solved by the second condition.

This will be described in detail below.

When a deployment schedule is calculated according to the first predetermined machine deployment calculation method, the deployment schedule may be calculated to allow migration of a VM between physical servers during the predetermined first time period (third condition).

However, data may be lost due to frequent migration of a VM. Consequently, migration of one VM during the predetermined first time period may be limited to a certain number of times (fourth condition).

For example, the certain number of times may be two.

However, the certain number of times is not limited thereto and may be variously changed within a range self-evident to those of ordinary skill in the art.

In addition, when a deployment schedule is calculated according to the first predetermined machine deployment calculation method, physical servers may be assumed to have the same specification (fifth condition (homogeneous condition)).

The objective function may include a first objective function, a second objective function, a third objective function, and a fourth objective function.

The processor may calculate four non-dominated solutions in which the objective functions have minimum values.

Therefore, according to the first predetermined machine deployment calculation method, four deployment schedules may be calculated.

The first predetermined machine deployment calculation method will be described in detail below.

Figure 8:
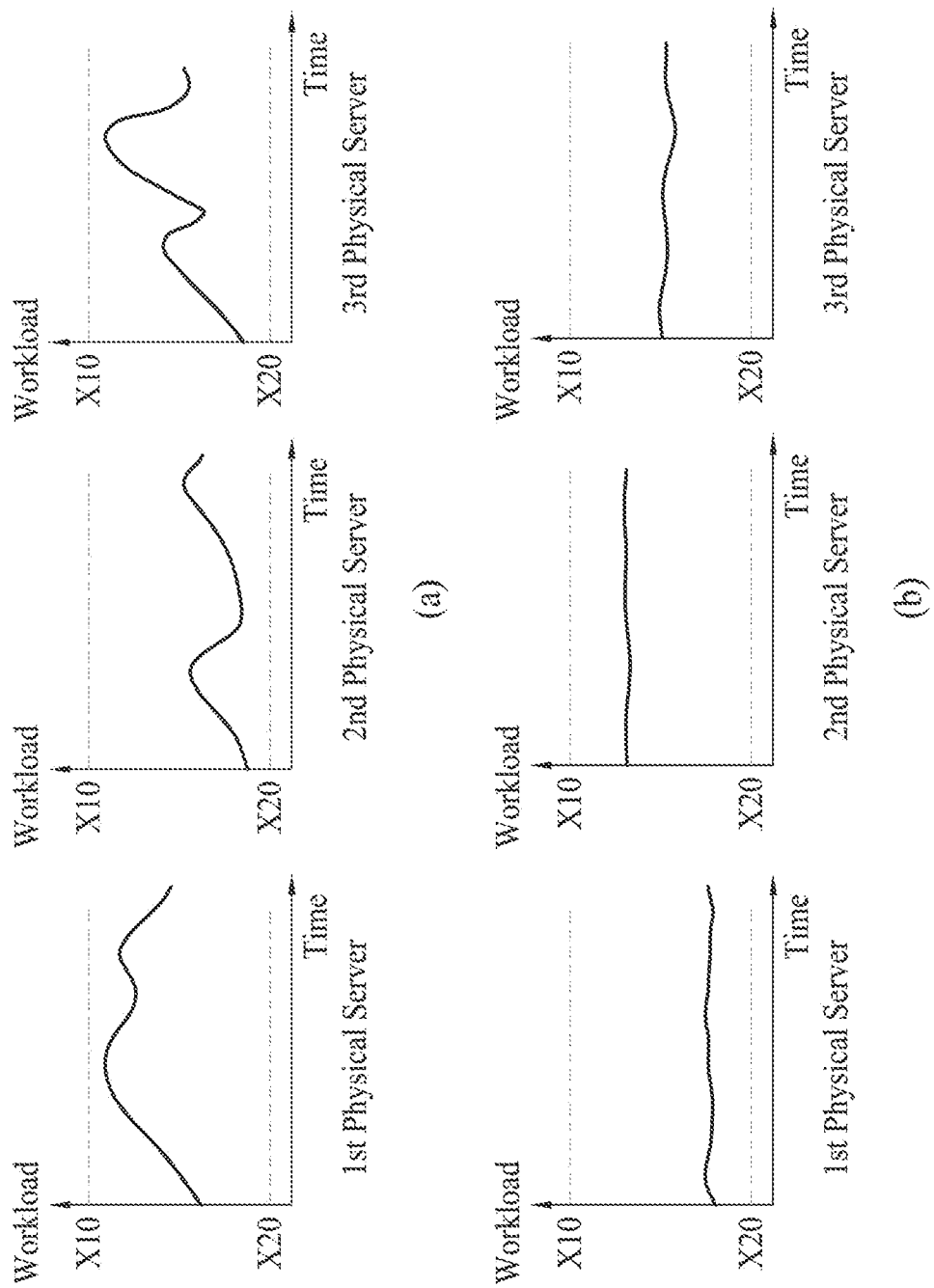
FIG. 8 is a set of graphs illustrating effects achieved with a VM deployment in consideration of a first objective function in the VM deployment method according to the exemplary embodiment of the present invention.

FIG. 8 is a set of graphs illustrating effects achieved with a VM deployment in consideration of a first objective function in the VM deployment method according to the exemplary embodiment of the present invention.

Referring to FIG. 8, the objective function may include the first objective function which is a function related to a load variation of a physical server calculated with the initially predicted virtual load during the predetermined first time period.

For example, FIG. 8A is a set of graphs showing loads on the first physical server to the third physical server when VMs are deployed on the first physical server to the third physical server according to a first schedule.

Also, FIG. 8B is a set of graphs showing loads on the first physical server to the third physical server when VMs are deployed on the first physical server to the third physical server according to a second schedule.

It has been described above that each physical server workload may be calculated by adding workloads of VMs installed on each physical server.

Referring to FIG. 8A, when VMs are deployed on the physical servers according to the first schedule, all physical server workloads may be less than the first reference X10 and greater than the second reference X20.

Also, referring to FIG. 8B, when VMs are deployed on the physical servers according to the second schedule, all physical server workloads may be less than the first reference X10 and greater than the second reference X20.

However, when VMs are deployed on the physical servers on the basis of the second schedule, a variation (slope) of each physical server workload may be smaller than that of a case in which VMs are deployed on the physical servers on the basis of the first schedule.

Accordingly, as a deployment schedule of VMs on the physical servers, the second schedule may be better than the first schedule.

Also, a value of the first objective function for deriving the second schedule may be smaller than a value of the first objective function for deriving the first schedule.

When a physical server workload has a high change rate, the physical server workload may exceed an arbitrary reference within only a short time period, and migration of a VM may occur.

In this case, as described above, migration of a VM may frequently occur, and thus a risk of data loss of the VM may be further increased.

The first objective function may be a function for preventing the risk.

Figure 9:
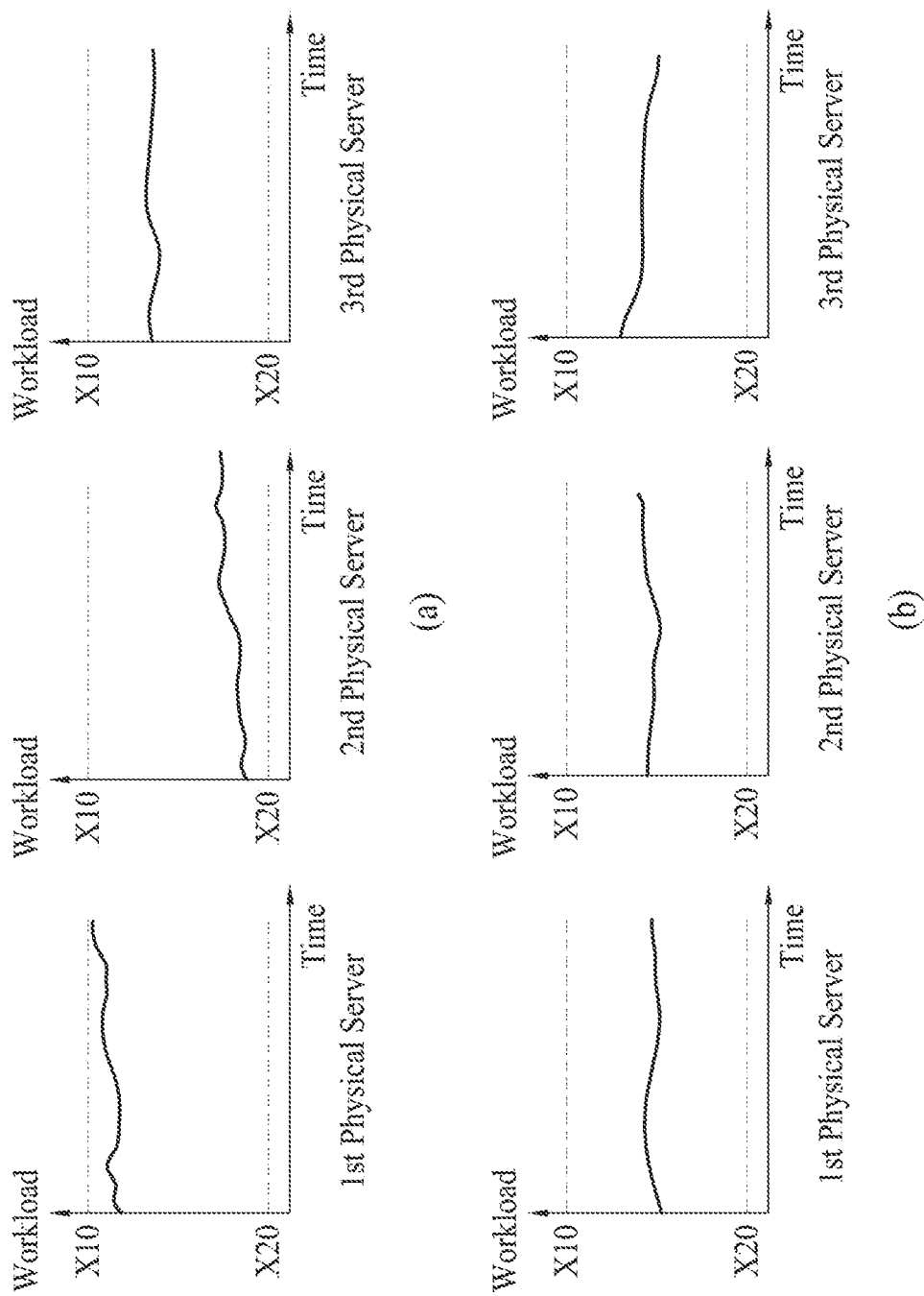
FIG. 9 is a set of graphs illustrating effects achieved with a VM deployment in consideration of a second objective function in the VM deployment method according to the exemplary embodiment of the present invention.

FIG. 9 is a set of graphs illustrating effects achieved with a VM deployment in consideration of a second objective function in the VM deployment method according to the exemplary embodiment of the present invention.

Referring to FIG. 9, the objective function may include the second objective function which is a function related to a difference between loads on the physical servers (physical server workloads) calculated with the initially predicted virtual load during the predetermined first time period.

For example, FIG. 9A is a set of graphs showing loads on the first physical server to the third physical server when VMs are deployed on the first physical server to the third physical server according to a third schedule.

Also, FIG. 9B is a set of graphs showing loads on the first physical server to the third physical server when VMs are deployed on the first physical server to the third physical server according to a fourth schedule.

It has been described above that each physical server workload may be calculated by adding workloads of VMs installed on each physical server.

Referring to FIG. 9A, when VMs are deployed on the physical servers according to the third schedule, all physical server workloads may be less than the first reference X10 and greater than the second reference X20.

Also, referring to FIG. 9B, when VMs are deployed on the physical servers according to the fourth schedule, all physical server workloads may be less than the first reference X10 and greater than the second reference X20.

However, when VMs are deployed on the physical servers on the basis of the fourth schedule, a difference (slope) between physical server workloads may be smaller than that of a case in which VMs are deployed on the physical servers on the basis of the third schedule.

Accordingly, as a deployment schedule of VMs on the physical servers, the fourth schedule may be better than the third schedule.

Also, a value of the second objective function for deriving the fourth schedule may be smaller than a value of the second objective function for deriving the third schedule.

To compare physical server workloads with each other, the physical servers may be compared with each other using an average value of loads of the physical servers corresponding to the predetermined first time period.

The second objective function may be intended to evenly use physical servers.

The objective function may include the third objective function which is a function related to the number of times that VMs are migrated on the first physical server and the second physical server so as to be deployed according to the deployment schedule.

In other words, the third objective function may be related to the number of times that VMs in a current deployment are migrated between physical servers so as to be deployed according to a deployment schedule.

The third objective function may be intended to find a deployment in which the number of times that VMs are migrated is minimized.

Each migration of a VM has a risk of data loss.

The third objective function may be intended to minimize the probability of data loss.

The objective function may include the fourth objective function which is a function related to whether the first physical server operates during the during the predetermined first time period.

In other words, the fourth objective function may be a function related to whether a physical server operates during the predetermined first time period.

When a value of the fourth objective function is reduced, the number of non-operating physical servers and a non-operating time of physical servers may be maximized.

When a value of the fourth objective function is minimized, the sum of non-operating times of all physical servers may be maximized.

The fourth objective function may serve to minimize power consumption of physical servers by minimizing an operating time of the physical servers.

A deployment schedule may indicate a schedule about how VMs are deployed on physical servers to minimize a value of each objective function while the first to fifth conditions are satisfied.

The objective functions may include the first objective function which is a function related to a load variation of a physical server calculated with the initially predicted virtual load during the predetermined first time period, the second objective function which is a function related to a difference between loads on physical servers calculated with the initially predicted virtual load during the predetermined first time period, the third objective function which is a function related to the number of times that the VMs are migrated on the first physical server and the second physical server to be deployed according to the deployment schedule, and the fourth objective function which is a function related to whether the first physical server operates during the predetermined first time period and whether the second physical server operates during the predetermined first time period.

The display (deployment display) may display the deployment schedules transferred from the processor (S240).

The processor may calculate first deployment schedule information which is information related to a first deployment schedule, second deployment schedule information which is information related to a second deployment schedule, third deployment schedule information which is information related to a third deployment schedule, and fourth deployment schedule information which is information related to a fourth deployment schedule.

The deployment schedules may include the first deployment schedule which is a deployment of VMs on physical servers (e.g., the first physical server and the second physical server) for minimizing the value of the second objective function, the value of the third objective function, and the value of the fourth objective function when the first objective function has a minimum value, the second deployment schedule which is a deployment of the VMs on physical servers (e.g., the first physical server and the second physical server) for minimizing the value of the first objective function, the value of the third objective function, and the value of the fourth objective function when the second objective function has a minimum value, the third deployment schedule which is a deployment of the VMs on physical servers (e.g., the first physical server and the second physical server) for minimizing the value of the first objective function, the value of the second objective function, and the value of the fourth objective function when the third objective function has a minimum value, and the fourth deployment schedule which is a deployment of the VMs on physical servers (e.g., the first physical server and the second physical server) for minimizing the value of the first objective function, the value of the second objective function, and the value of the third objective function when the fourth objective function has a minimum value.

The first predetermined machine deployment calculation method will be described below with an example of one deployment schedule.

Figure 10:
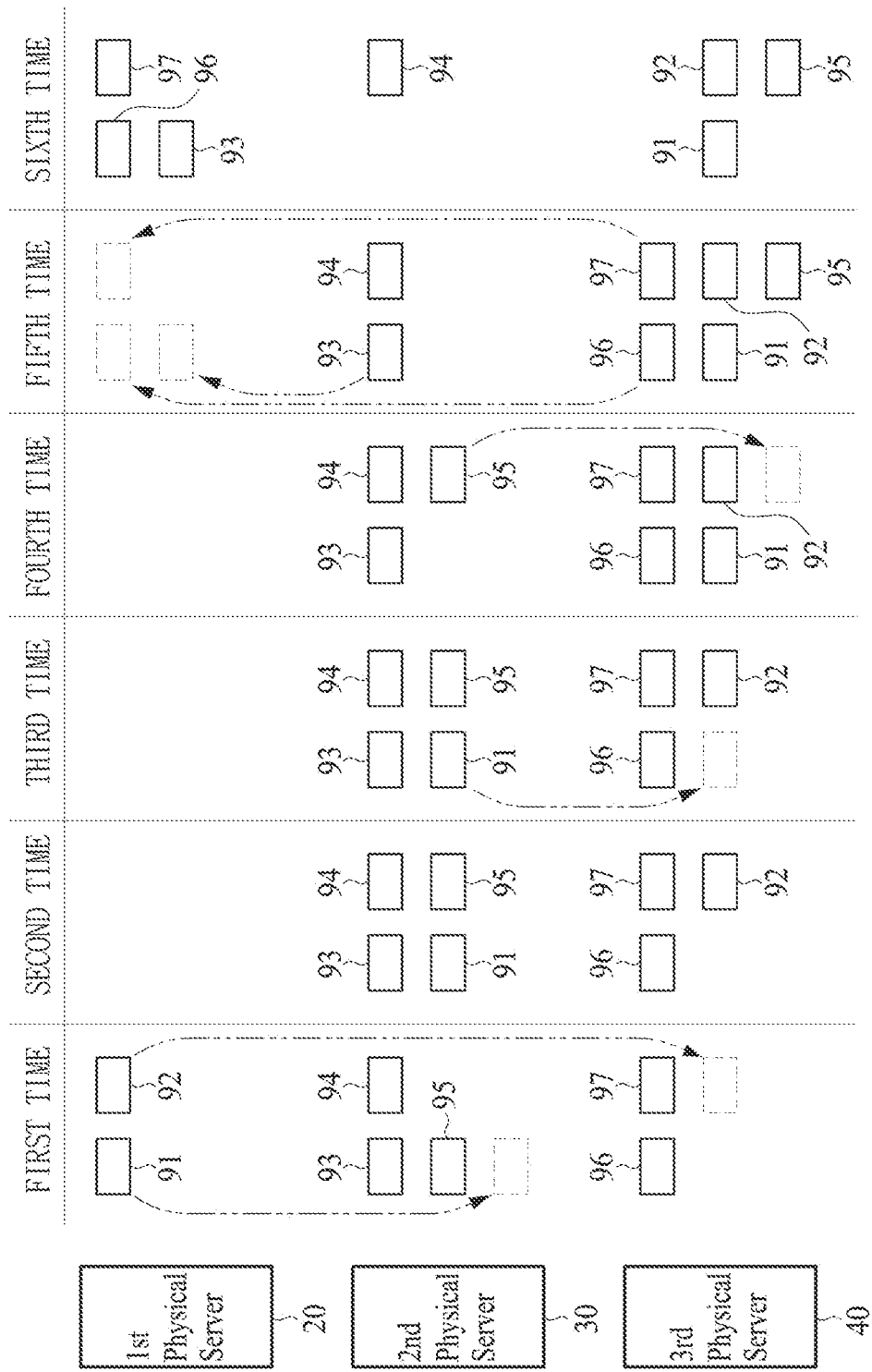
FIG. 10 is a diagram illustrating a deployment schedule calculation operation in the VM deployment method according to the exemplary embodiment of the present invention.

FIG. 10 is a diagram illustrating a deployment schedule calculation operation in the VM deployment method according to the exemplary embodiment of the present invention.

FIG. 10 shows schedules of VMs deployed on physical servers during a certain time period in the predetermined first time period.

As an example, FIG. 10 may relate to the first deployment schedule for minimizing a value of the first objective function, and the first deployment schedule will be described below on the basis of this example.

However, this is only an example, and the present invention is not limited thereto.

For example, physical servers may include the first physical server 20, the second physical server 30, and the third physical server 40, VMs may include a first VM 91, a second VM 92, a third VM 93, a fourth VM 94, a fifth VM 95, a sixth VM 96, and a seventh VM 97.

For example, to minimize values of the other objective functions while a value of the first objective function is minimized, the processor may calculate deployment schedules so that the first VM 91 and the second VM 92 may be deployed on the first physical server 20, so that the third VM 93, the fourth VM 94, and the fifth VM 95 may be deployed on the second physical server 30, and so that the sixth VM 96 and the seventh VM 97 may be deployed on the third physical server 40 during a zeroth time period which is the preceding time period of a first time period.

According to the VM deployment of the zeroth time period, a load of the first physical server 20 may be predicted to be the second reference or less during the first time period.

In this case, the first-second condition is satisfied, and a deployment schedule may be calculated so that the first VM 91 and the second VM 92 deployed on the first physical server 20 may be migrated to another server.

When VMs are migrated under the first-second condition, a physical server to which the VMs are migrated may be determined so that a value of the first objective function may be minimized.

On the basis of the determination, a deployment schedule may be calculated so that the first VM 91 may be migrated to the second physical server 30 and the second VM 92 may be migrated to the third physical server 40.

The deployment schedule may be calculated so that the first physical server 20 may not operate during a second time period due to the migration during the first time period.

For example, assuming that, when the third VM 93, the fourth VM 94, the fifth VM 95, and the first VM 91 are deployed on the second physical server 30 and the second VM 92, the sixth VM 96, and the seventh VM 97 are deployed on the third physical server 40, the other objective functions are minimized while the first objective function is minimized, no migration may occur during the second time period.

To minimize values of the other objective functions while a value of the first objective function is minimized, the deployment schedule may be calculated so that the first VM 91 deployed on the second physical server 30 may be migrated to the third physical server 40 during a third time period.

Also, to minimize values of the other objective functions while a value of the first objective function is minimized, the deployment schedule may be calculated so that the fifth VM 95 deployed on the second physical server 30 may be migrated to the third physical server 40 during a fourth time period.

During the second time period to the fourth time period, the first physical server 20 may not operate.

This may denote that the deployment schedule is calculated so that the first physical server 20 may not operate during the second time period to the fourth time period under the influence of the fourth objective function.

According to the VM deployment of the fourth time period, a load of the third physical server 40 may be predicted to be the first reference or more during the fifth time period.

In this case, the deployment schedule may be calculated so that at least one of the VMs deployed on the third physical server 40 may be migrated to another physical server during the fifth time period (first-first condition).

According to the VM deployment of the fourth time period, a load of the second physical server 30 may be predicted to be the first reference or more during the fifth time period (first-first condition).

In this case, the deployment schedule may be calculated so that at least one of the VMs deployed on the second physical server 30 may be migrated to another physical server during the fifth time period (first-first condition).

However, the first VM 91 deployed on the third physical server 40 is migrated during the first time period and the third time period and thus may be excluded from migration targets during the fifth time period (fourth condition).

Also, when both of the third VM 93 and the fourth VM 94 deployed on the second physical server 30 are migrated to the first physical server 20, the second physical server 30 stops operating, and the first physical server 20 may start operating.

This does not satisfy the second condition, and thus only one of the third VM 93 and the fourth VM 94 may be migrated from the second physical server 30 to the first physical server 20.

For example, to minimize values of the other objective functions while a value of the first objective function is minimized, the first condition to the fourth condition (specifically, the first-second condition and the second condition) may be satisfied. To this end, the third VM 93 may be migrated from the second physical server 30 to the first physical server 20, and the sixth VM 96 and the seventh VM 97 may be migrated from the third physical server 40 to the first physical server 20.

The deployment schedule may be calculated so that no migration may occur during a sixth time period because minimum values of the objective functions are satisfied due to the migration during the fifth time period.

Although the first deployment schedule has been described above, this is only an example, and detailed descriptions of methods of calculating a schedule on the basis of the second deployment schedule, the third deployment schedule, and the fourth deployment schedule may be omitted when the detailed descriptions overlap with the above description.

The display may display the first deployment schedule, the second deployment schedule, the third deployment schedule, and the fourth deployment schedule.

The four objective functions are separate functions and may have four non-dominated solutions. Consequently, the first deployment schedule, the second deployment schedule, the third deployment schedule, and the fourth deployment schedule may indicate separate solutions.

A worker may determine one of the first deployment schedule, the second deployment schedule, the third deployment schedule, and the fourth deployment schedule and select and input the determined deployment schedule.

The input section may calculate information related to the selected deployment schedule and transfer the information to the processor.

Figure 11:
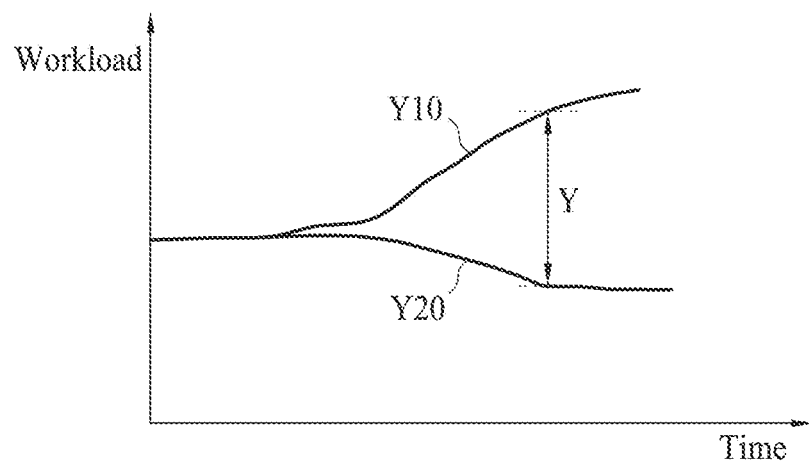
FIG. 11 is a graph illustrating a method of calculating a prediction error in the VM deployment method according to the exemplary embodiment of the present invention.

FIG. 11 is a graph illustrating a method of calculating a prediction error in the VM deployment method according to the exemplary embodiment of the present invention.

The processor may migrate and deploy VMs on physical servers on the basis of the selected deployment schedule (S260).

In this way, resources of the physical servers may not be concentrated in one physical server and may be used evenly.

In addition, the VM deployment method according to the exemplary embodiment of the present invention may further include an operation S270 of determining, when the VMs are deployed on the first physical server and the second physical server according to the deployment schedule, whether selectively predicted virtual load information, which is information related to a selectively predicted virtual load associated with predicted loads on the physical servers, is calculated normally according to the predetermined check method on the basis of the selectively predicted virtual load information and actual virtual workload information which is information related to an actual workload corresponding to loads actually imposed on the physical servers by the VMs.

The selectively predicted virtual load information may be identical to the initially predicted virtual load information.

However, the selectively predicted virtual load information is not limited thereto and may not be identical to the initially predicted virtual load information.

In this case, the processor may deploy the VMs according to the selected deployment schedule and then calculate selectively predicted virtual load information by predicting loads of the VMs for a certain time period.

The predetermined check method may be a method of determining that the selectively predicted virtual load is calculated inaccurately when a difference between the actual workload of the VMs and the selectively predicted virtual load information corresponding thereto is a certain value or more.

As a specific example, FIG. 11 may be a graph of a first workload Y10 representing a selectively predicted virtual load which is a predicted load of a first VM and a second workload Y20 representing an actual workload of the first VM.

When a difference between the first workload and the second workload is a certain load (certain value) Y or more, the processor may determine that the load of the first VM is predicted inaccurately.

When it is determined that the selectively predicted virtual load is calculated inaccurately, the processor may calculate re-predicted virtual load information, which is information related to a re-predicted virtual load associated with a load on a physical server predicted to be caused by the VM, during a predetermined second time period from a redetermination time point which is a time point at which it is determined that the selectively predicted virtual load is calculated inaccurately (S280).

The processor may recalculate a deployment schedule according to the above-described first predetermined machine deployment calculation method on the basis of the re-predicted virtual load information (S280) and may perform a certain computation so that the VMs may be redeployed on the basis of the recalculated deployment schedule (S290).

The detailed description thereof may be omitted when overlapping the above description.

The predetermined second time period may be identical to or different from the predetermined first time period.

Such a VM deployment method may be repeatedly and continuously performed.

The worker may select one of a plurality of deployment schedules to redeploy the VMs (S290), and the processor may redeploy the VMs on the basis of the selected deployment schedule (S290).

The detailed description thereof may be omitted when overlapping the above description.

A VM deployment device according to an exemplary embodiment of the present invention implements a VM deployment method of deploying a plurality of VMs on a first physical server and a second physical server to efficiently run a physical server, on which VMs are installed, including the first physical server and the second physical server. The VM deployment device includes a processor and a storage in which a program for performing the VM deployment method is stored.

The VM deployment method includes an operation of calculating VM workload information, which is information related to VM workloads corresponding to loads on the physical servers imposed by the VMs, according to the predetermined workload calculation method on the basis of information related to operation of the first physical server and the second physical server, an operation of calculating initially predicted virtual load information which is information related to an initially predicted virtual load associated with loads on the physical servers predicted to be imposed by the VMs during a predetermined first time period on the basis of the VM workloads, an operation of calculating deployment schedule information, which is information related to a deployment schedule of the VMs on the first physical server and the second physical server, according to a first predetermined machine deployment calculation method, and an operation of migrating and deploying the VMs on the first physical server and the second physical server so that the VMs may be deployed on the first physical server and the second physical server according to the deployment schedule calculated by the first predetermined machine deployment calculation method. The first predetermined machine deployment calculation method may be a method of calculating the deployment schedule of the VMs to minimize an objective function value on the basis of the initially predicted virtual load information.

3. VM Deployment Simulation Method and VM Deployment Simulation Device for Implementing the Same Referring to FIG. 1, the VM deployment simulation device C10 according to the exemplary embodiment of the present invention may include a simulation processor C11 for processing information (e.g., data) required for performing a VM deployment simulation method, a simulation storage C12 for storing the information required for performing the VM deployment simulation method, a simulation input section C13 for generating a signal related to the information required for performing the VM deployment simulation method by a user's manipulation, a simulation transceiver C14 for transmitting and receiving the information required for performing the VM deployment simulation method, a simulation display C15 for displaying an image, and a simulation controller C16 for controlling the simulation processor C11, the simulation storage C12, the simulation input section C13, the simulation transceiver C14, and/or the simulation display C15 so that the VM deployment simulation method may be smoothly performed.

The simulation processor C11 may perform computations, such as processing all information required for implementing the VM deployment simulation method, on the basis of the information stored in the simulation storage C12.

For example, the simulation processor C11 may indicate a CPU.

However, the simulation processor C11 is not limited thereto and may include any device or part which may perform computations required for implementing the VM deployment simulation method.

In the simulation storage C12, information (data) required for implementing the VM deployment simulation method may be stored.

A program for performing the VM deployment simulation method may be stored in the simulation storage C12.

For example, the simulation storage C12 may be a hard disk as an auxiliary storage device.

However, the simulation storage C12 is not limited thereto and may include any element in which information required for implementing the VM deployment simulation method may be stored.

For example, the simulation storage C12 may be a database.

The deployment transceiver C14 may receive information or transfer information through an arbitrary medium.

For example, the simulation transceiver C14 may receive information from a physical server or transfer information to a physical server.

As an example, the simulation transceiver C14 may receive information directly from the physical server but may receive information on the physical server through a separate storage medium.

The simulation transceiver C14 may receive information to be received through another element provided in the VM deployment simulation device C10.

Alternatively, the simulation transceiver C14 may receive certain information from another element provided in the VM deployment simulation device C10.

The simulation input section C13 may generate an input signal by manipulation of the user.

When the input signal is received by the simulation processor C11, the simulation processor C11 may generate information corresponding to the received input signal.

For example, the simulation input section C13 may be a keyboard.

However, the simulation input section C13 is not limited thereto, and the type of simulation input section C13 may be varied within a range self-evident to those of ordinary skill in the art.

The simulation display C15 (identical to a display section in the following description) may display a certain image under the control of the simulation controller C16.

For example, the display C15 may be a display.

However, the display C15 is not limited thereto, and the type of display C15 may be varied within a range self-evident to those of ordinary skill in the art.

The simulation controller C16 may control the simulation processor C11, the simulation storage C12, the simulation input section C13, and the simulation transceiver C14 so that the VM deployment simulation device C10 may smoothly perform the VM deployment simulation method.

The elements in the VM deployment simulation device C10 may be connected to each other in a wired and/or wireless manner.

Each of the elements in the VM deployment simulation device C10 may be connected to the physical servers in a wired and/or wireless manner.

The VM deployment simulation method implemented by the VM deployment simulation device C10 will be described in detail below.

Figure 12:
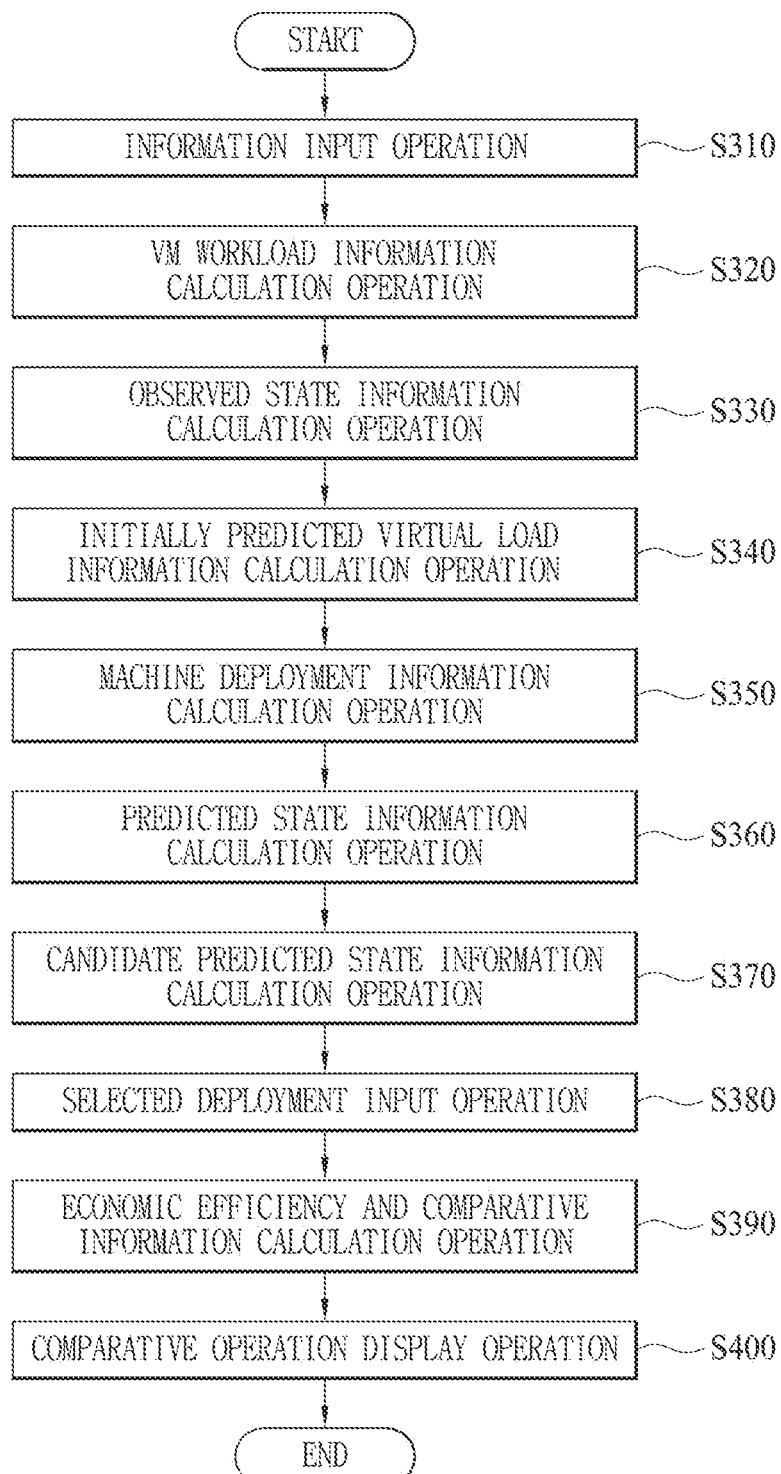
FIG. 12 is a flowchart of a VM deployment simulation method according to an exemplary embodiment of the present invention.

FIG. 12 is a flowchart of a VM deployment simulation method according to an exemplary embodiment of the present invention.

Referring to FIG. 12, the VM deployment simulation method according to the exemplary embodiment of the present invention may include an operation S310 of calculating designation information, which is previously designated information required for a simulation, in response to a signal generated by the input section, an operation S320 of calculating VM workload information, which is information related to VM workload information corresponding to loads on the physical servers imposed by the VMs, according to the predetermined workload calculation method on the basis of information stored in the storage (simulation storage) and related to operation of the physical servers, an operation S330 of calculating observed state information which is information related to states of the first physical server and the second physical server during a first time period and calculated on the basis of information that is stored in the storage and related to operation of the first physical server and the second physical server, and an operation S340 of calculating initially predicted virtual load information, which is information related to an initially predicted virtual load associated with loads on the physical servers predicted to be imposed by the VMs during the second time period, according to a predetermined prediction method using the information stored in the storage and related to operation of the first physical server and the second physical server.

Also, the VM deployment simulation method according to the exemplary embodiment of the present invention may further include an operation S350 of calculating machine deployment information, which is information related to a machine deployment corresponding to a deployment of the VMs on the first physical server and the second physical server calculated according to a predetermined machine deployment calculation method and an operation S360 of calculating predicted state information, which is information related to states of the first physical server and the second physical server during a second time period, on the basis of the initially predicted virtual load information when the VMs are deployed on the first physical server and the second physical server according to the machine deployment.

In addition, the VM deployment simulation method according to the exemplary embodiment of the present invention may include an operation S370 of calculating candidate predicted state information which is information related to a value within a range of a maximum to a minimum of predicted state values calculated on the basis of the plurality of pieces of predicted state information, an operation of displaying a candidate predicted state value calculated on the basis of the predicted state value and the candidate predicted state information on the display section according to a predetermined display method, an operation S380 of calculating selected deployment information related to a selected deployment which is a deployment selected as a new deployment of the VMs on the first physical server and the second physical server, an operation S390 of calculating economic efficiency information which is information related to economic benefit acquired when the VMs are deployed in the selected deployment in relation to a case in which the VMs are deployed in a past deployment, and an operation S400 of calculating comparative information on the basis of the observed state information and the predicted state information, which is information related to states of the first physical server and the second physical server during the second time period and calculated on the basis of the information that is stored in the storage and related to operation of the first physical server and the second physical server, to compare a case in which the VMs are deployed in the selected deployment selected on the basis of the predicted state information with a case in which the VMs are deployed in the past deployment corresponding to a deployment of the VMs which is a base of the observed state information.

Each operation will be described in detail below.

Figure 13:
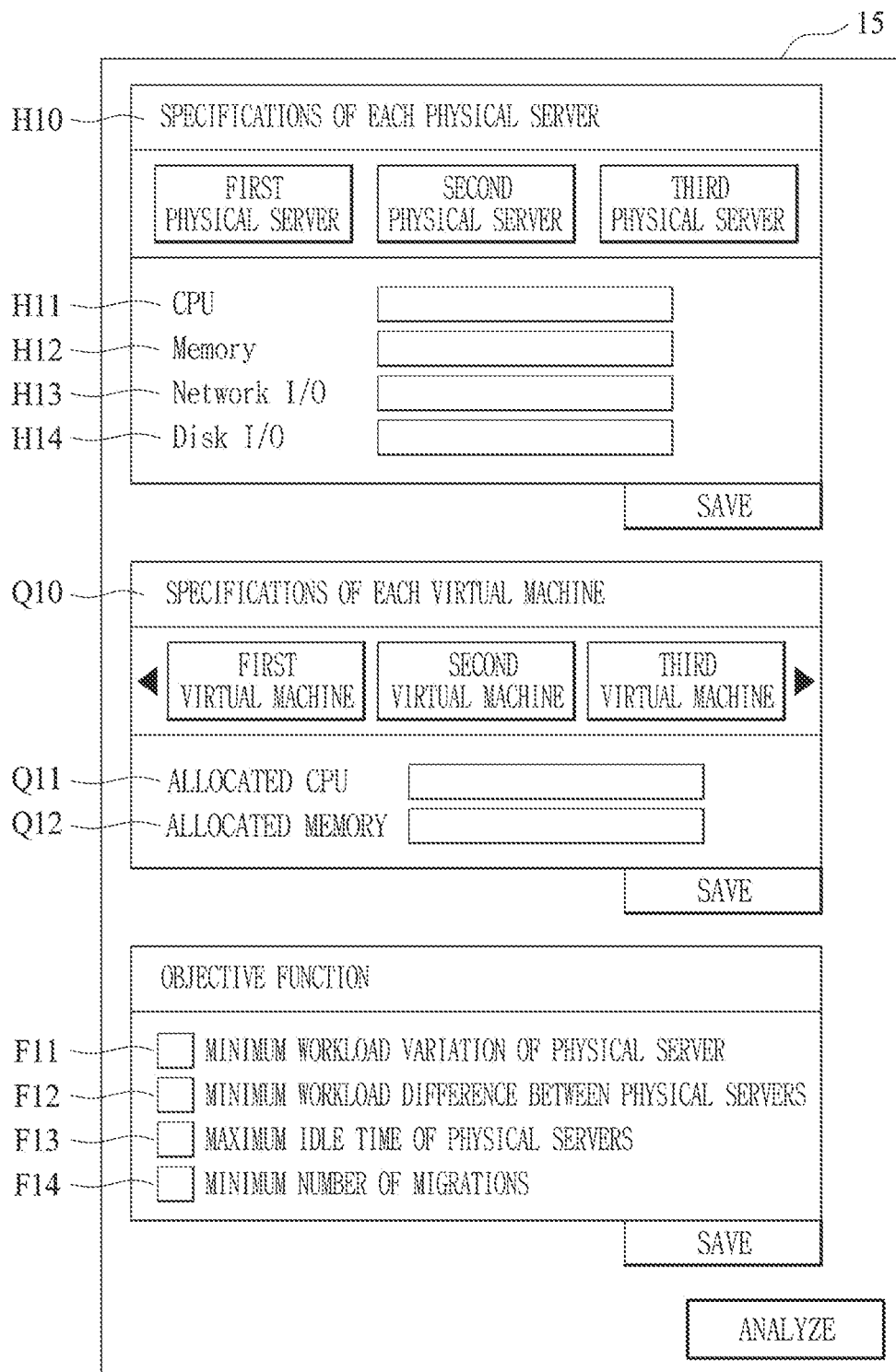
FIG. 13 is a diagram illustrating an operation of inputting information in the VM deployment simulation method according to the exemplary embodiment of the present invention.

FIG. 13 is a diagram illustrating an operation of inputting information in the VM deployment simulation method according to the exemplary embodiment of the present invention.

Referring to FIG. 13, the user may input values displayed on a screen of a display section 15 through the input section.

The user may select a physical server and/or a VM of which designation information will be input by the user.

The processor (simulation processor) may calculate the designation information by the user's manipulation of the input section.

The designation information is information required for a simulation and may be previously designated by the user.

For example, the designation information may include information related to specifications H10 of each physical server.

For example, the user may input a CPU value H11, a memory value H12, a network input/output (I/O) value H13, and/or a disk I/O value H14.

For example, the designation information may include information related to specifications Q10 of each VM.

For example, the user may input a CPU ratio Q11 allocated to an arbitrary VM on a physical server and/or a memory ratio Q12 allocated to the arbitrary VM through the input section.

For example, the designation information may include information related to an objective function used in the predetermined machine deployment calculation method.

For example, lists of objective functions which may be used in the predetermined machine deployment calculation method may be displayed on the display section 15, and the user may select an objective function to be used in the predetermined machine deployment calculation method.

The designation information may be calculated by the user's selection.

For example, the objective function may include a first objective function F11 which is a function related to a load variation of a physical server, a second objective function F12 which is a function related to a difference between loads on physical servers, a third objective function F14 which is a function related to the number of times that the VMs are migrated on physical servers, and a fourth objective function F13 which is a function related to whether the physical servers are operating.

The objective functions will be described in detail below.

Figure 14:
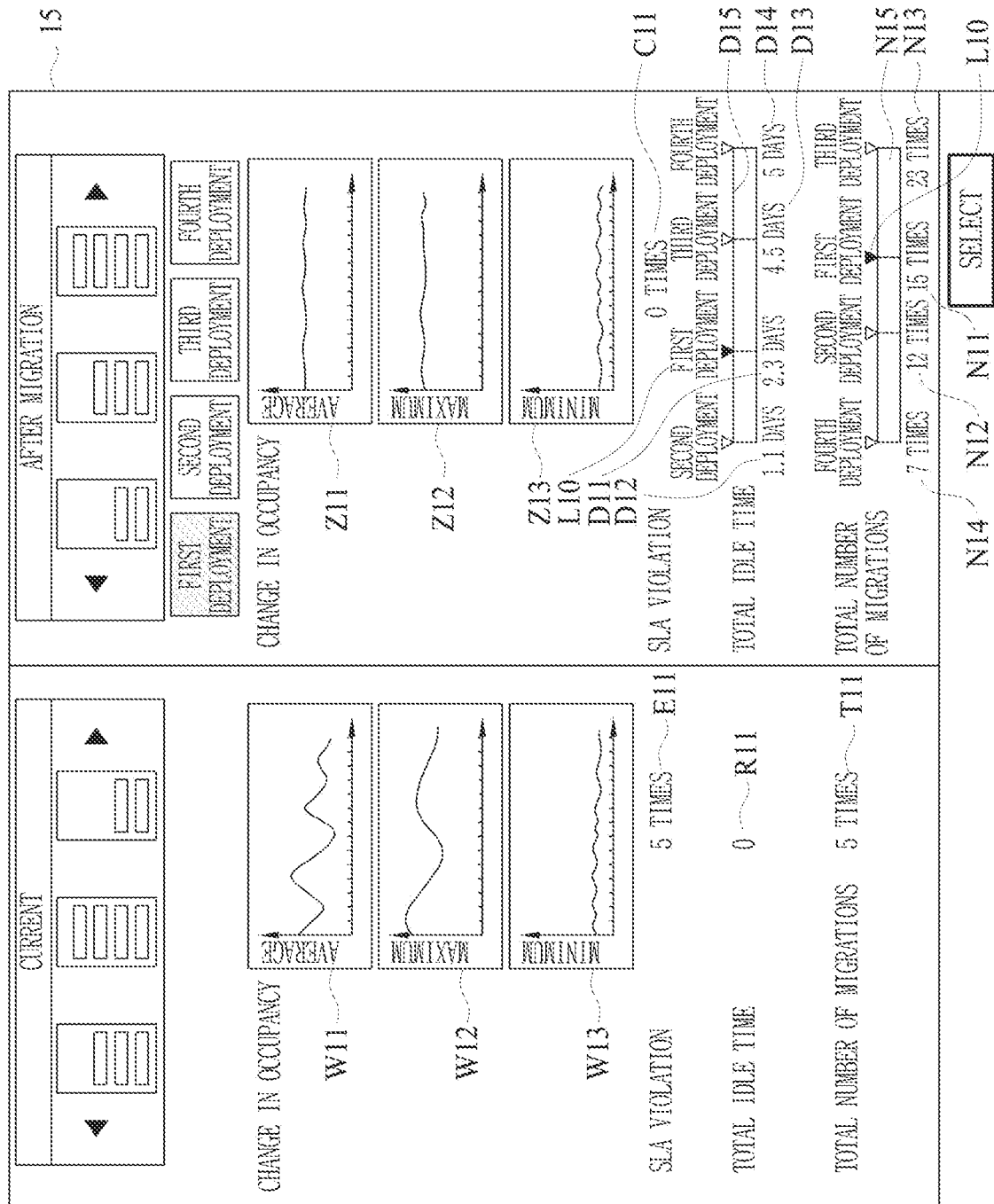
FIG. 14 is a diagram illustrating a process of setting a selected deployment in the VM deployment simulation method according to the exemplary embodiment of the present invention.

FIG. 14 is a diagram illustrating a process of setting a selected deployment in the VM deployment simulation method according to the exemplary embodiment of the present invention.

After all input values displayed in the display are input, a simulation may be performed.

In the storage, information related to operation of the physical servers may be stored.

The processor may calculate the VM workload information on the basis of the information related to operation of the physical server according to the predetermined workload calculation method.

A VM workload may indicate a load on resources of a physical server when a VM is run on the physical server.

The VM workload may indicate a load assigned to the physical server when the VM is run on the physical server.

For example, the VM workload may be calculated as a load which is imposed on a CPU of the physical server by the VM running on the physical server.

Consequently, the predetermined workload calculation method may include a method of calculating a VM workload as a load assigned to a CPU of a physical server.

In other words, according to the predetermined workload calculation method, the VM workload information may be calculated on the basis of only the degree of operation of a CPU (CPU utilization).

In the predetermined workload calculation method, it may be assumed that one VM is executed on only one physical server.

As an example, this may denote that one VM is not implemented on two physical servers.

A VM workload may indicate a load assigned to a physical server by a running VM.

A physical server workload may indicate a load assigned to the physical server.

For example, the physical server workload may be calculated as a load assigned to a CPU of the physical server.

For example, the physical server workload may be calculated by adding loads on the physical server imposed by VMs deployed on the physical server.

In this way, basic data which is described below and required for prediction is simplified so that the accuracy of prediction in an operation to be described below may be further increased.

The processor may calculate observed state information related to the physical servers operating in the first time period.

The observed state information may include observed occupancy information which is information related to loads on the physical servers imposed by the VMs during the first time period, observed violation information which is information related to whether a predetermined reference is violated when the VMs run on the physical servers during the first time period, observed idle state information which is information related to a time in which the physical servers do not operate because the VMs are not deployed on the physical servers during the first time period, and observed migration information which is information related to the number of times that the VMs are migrated during the first time period.

The observed occupancy information may be information related to values of loads on the physical servers imposed by the VMs during the first time period.

For example, referring to FIG. 14, a load (physical server workload) value of each physical server may be represented as an average graph W11, a maximum value graph W12, and a minimum value graph W13 on the display section.

The average graph W11 may indicate a graph showing the average of loads assigned to each physical server during the first time period.

The maximum value graph W12 may indicate a graph showing only maximum values extracted from loads assigned to each physical server during the first time period.

The minimum value graph W13 may indicate a graph showing only minimum values extracted from loads assigned to each physical server during the first time period.

From such graphs, the user can clearly grasp the degree of operation of a physical server so far.

The observed occupancy information may be calculated on the basis of the VM workload information.

The observed violation information may be information about whether a predetermined reference is violated when the physical servers on which the VMs are deployed operate.

The predetermined reference may indicate a certain reference based on which the physical servers are recommended to operate.

For example, the predetermined reference may include a reference that a load assigned to the physical server is 90% or less of a total load.

However, the predetermined reference is not limited thereto and may be variously changed and added according to a mode, purpose, and place of use.

For example, referring to FIG. 14, an observed violation value E11 calculated on the basis of the observed violation information may be displayed on the display section.

The observed idle state information may be information related to a time in which the physical servers do not operate because the VMs are not deployed on the physical servers.

The observed idle state information may be calculated as the sum of idle times of all the physical servers.

For example, referring to FIG. 14, an observed idle state value R11 calculated on the basis of the observed idle state information may be displayed on the display section.

The observed migration information may be information related to the number of times that the VMs are migrated on the physical servers.

The observed migration information may be calculated as the sum of the numbers of migrations on all the physical servers.

For example, referring to FIG. 14, an observed migration value T11 calculated on the basis of the observed migration information may be displayed on the display section.

For example, referring to FIG. 14, values related to the observed state information and values related to the predicted state information may be simultaneously displayed on the display section 15.

In this way, the user can clearly compare states before a change and states after the change and make a judgement.

A process for calculating the predicted state information will be described in detail below.

The processor may calculate initially predicted virtual load information related to an initially predicted virtual load associated with loads on the physical servers predicted to be imposed by the VMs during the predetermined second time period, which is a future time period, according to the predetermined prediction method using the VM workload information.

In other words, this may be a process of predicting what workloads on the physical servers will be imposed by the VMs in the future on the basis of process data stored in the storage.

For example, the predetermined prediction method may be a method of calculating VM workload information of the second time period using an algorithm, such as a multiple regression model, ARIMA analysis, or deep learning, on the basis of the VM workload information.

However, the predetermined prediction method is not limited thereto and may be any well-known technique for implementing a method of predicting a future workload. The detailed description thereof is self-evident to those of ordinary skill in the art and may be omitted.

For example, the initially predicted virtual load may be a VM workload which is predicted for the second time period from the time point for VM workload information calculation or the second time period from an arbitrary time point.

The processor may calculate the machine deployment information according to a predetermined machine deployment calculation method on the basis of the calculated initially predicted virtual load information.

The predetermined machine deployment calculation method may be identical to the above-described predetermined machine deployment calculation method, and the detailed description thereof may be omitted when overlapping the above description.

The number of machine deployments may vary depending on the number of objective functions designated by the user.

For example, when three objective functions are designated by the user, three machine deployments may be calculated.

This may be because the objective functions have solutions which are not dominated by each other.

The processor may calculate predicted state information of a case in which the VMs are deployed on the physical servers according to each of the machine deployments.

In other words, when there are a plurality of objective functions, a plurality of pieces of predicted state information may be generated.

The predicted state information may be calculated on the basis of the initially predicted virtual load information.

The predicted state information may include at least one of predicted occupancy information which is information related to loads on the physical servers predicted to be imposed by the VMs during the second time period, predicted violation information which is information related to whether the predetermined reference is violated when the VMs are assumed to run in an arbitrary deployment on the physical servers during the second time period, predicted idle state information which is information related to a time in which the physical servers do not operate because the VMs are not deployed on the physical servers during the second time period, and predicted migration information which is information related to the number of times that the VMs are migrated during the second time period.

The predicted occupancy information may be information related to a value of a load on the physical servers imposed by the VMs during the second time period.

For example, a load value of each physical server may be represented as an average graph Z11, a maximum value graph Z12, and a minimum value graph Z13 on the display section.

The average graph Z11 may indicate a graph showing the average of loads assigned to each physical server during the second time period.

The maximum value graph Z12 may indicate a graph showing only maximum values extracted from loads assigned to each physical server during the second time period.

The minimum value graph Z13 may indicate a graph showing only minimum values extracted from loads assigned to each physical server during the second time period.

From such graphs, the user can clearly find the future degree of operation of a physical server.

The observed occupancy information may be calculated on the basis of the VM workload information.

The predicted violation information may be information about whether the predetermined reference is violated when the physical servers operate during the second time period.

A predicted violation value C11 which is a value of the predicted violation information may be displayed on the display section.

The detailed description of the predetermined reference may be omitted when overlapping the above description.

The predicted idle state information may be information related to a time in which the physical servers do not operate because the VMs are not deployed on the physical servers during the second time period.

The predicted idle state information may be calculated as the sum of idle times of all the physical servers.

The predicted migration information may be information related to the number of times that the VMs are migrated on the physical servers during the second time period.

The predicted migration information may be calculated as the sum of the numbers of migrations on all the physical servers.

The processor may calculate predicted state information for each of the machine deployments.

An input mark for selecting each machine deployment may be displayed on the display section.

On the basis of machine deployment information input through the display section, predicted state information corresponding to the machine deployment information may be displayed on the display section.

For example, referring to FIG. 14, it is assumed that there are four machine deployments because the user designates four objective functions.

When the user clicks a first deployment, the display section may display values related to predicted state information of a case in which the VMs are deployed in the first deployment during the second time period.

On the other hand, when the user clicks a second deployment, the display section may display values related to predicted state information of a case in which the VMs are deployed in the second deployment during the second time period.

However, regardless of the user's machine deployment selection, the display section may display predicted idle state values D11, D12, D13, and D14 related to predicted idle state information and/or predicted migration values N11, N12, N13, and N14 related to predicted migration information.

The predicted idle state values and the predicted migration values related to the VM deployment designated by the user may be displayed as a mark L10 on the display section.

The processor may calculate candidate predicted state information on the basis of the predicted state information.

Specifically, the processor may calculate first candidate predicted state information on the basis of the predicted idle state information corresponding to each machine deployment.

As for the first candidate predicted state information, a predicted idle state value corresponding to each machine deployment may be calculated.

In this case, values between a maximum predicted idle state value and a minimum predicted idle state value may be first candidate predicted state values, and data related to the first candidate predicted state values may be the first candidate predicted state information.

Specifically, referring to FIG. 14, it is assumed that the user designates the four objective functions. In the case of the first VM deployment, the predicted idle state value D11 may be 2.3 days. In the case of the second VM deployment, the predicted idle state value D12 may be 1.1 days. In the case of the third VM deployment, the predicted idle state value D13 may be 4.3 days. In the case of the fourth VM deployment, the predicted idle state value D14 may be 5 days.

The maximum predicted idle state value may be the predicted idle state value D14 of the fourth VM deployment, and the minimum predicted idle state value may be the predicted idle state value D12 of the second VM deployment.

Therefore, a first candidate predicted state value D15 may be a value between 1.1 days and 5 days excluding the predicted idle state value of the first VM deployment and the predicted idle state value of the third VM deployment.

Also, the processor may calculate second candidate predicted state information on the basis of predicted migration information corresponding to each machine deployment.

Likewise, a predicted migration value corresponding to each machine deployment may be calculated.

In this case, values between a maximum predicted migration value and a minimum predicted migration value may be second candidate predicted state values, and data related to the second candidate predicted state values may be the second candidate predicted state information.

Specifically, referring to FIG. 14, it is assumed that the user designates the four objective functions. In the case of the first VM deployment, the predicted migration value N11 may be 15 times. In the case of the second VM deployment, the predicted migration value N12 may be 12 times. In the case of the third VM deployment, the predicted migration value N13 may be 23 times. In the case of the fourth VM deployment, the predicted migration value N14 may be 7 times.

The maximum predicted migration value may be the predicted migration value N13 of the fourth VM deployment, and the minimum predicted idle state value may be the predicted migration value N14 of the fourth VM deployment.

Therefore, a second candidate predicted state value N15 may be a value between 7 times and 23 times excluding the predicted migration value N12 of the second VM deployment and the predicted migration value N11 of the first VM deployment.

The processor may display the candidate predicted state values D15 and N15 on the display section according to a predetermined display method.

The predetermined display method may be a method of displaying predicted state values and candidate predicted state values as a certain range (e.g., a bar format).

The predicted state values may be values calculated on the basis of the predicted state information.

As a specific example, referring to FIG. 14, the predetermined display method may include a method of displaying the predicted idle state values D11, D12, D13, and D14 and the first candidate predicted state value D15 as a certain range.

Also, referring to FIG. 14, the predetermined display method may include a method of displaying the predicted migration values N11, N12, N13, and N14 and the second candidate predicted state value N15 as a certain range.

In this way, the user can effectively compare states of the physical servers when the VMs are deployed in the separate machine deployments.

The user may select one VM deployment among the machine deployments.

Figure 15:
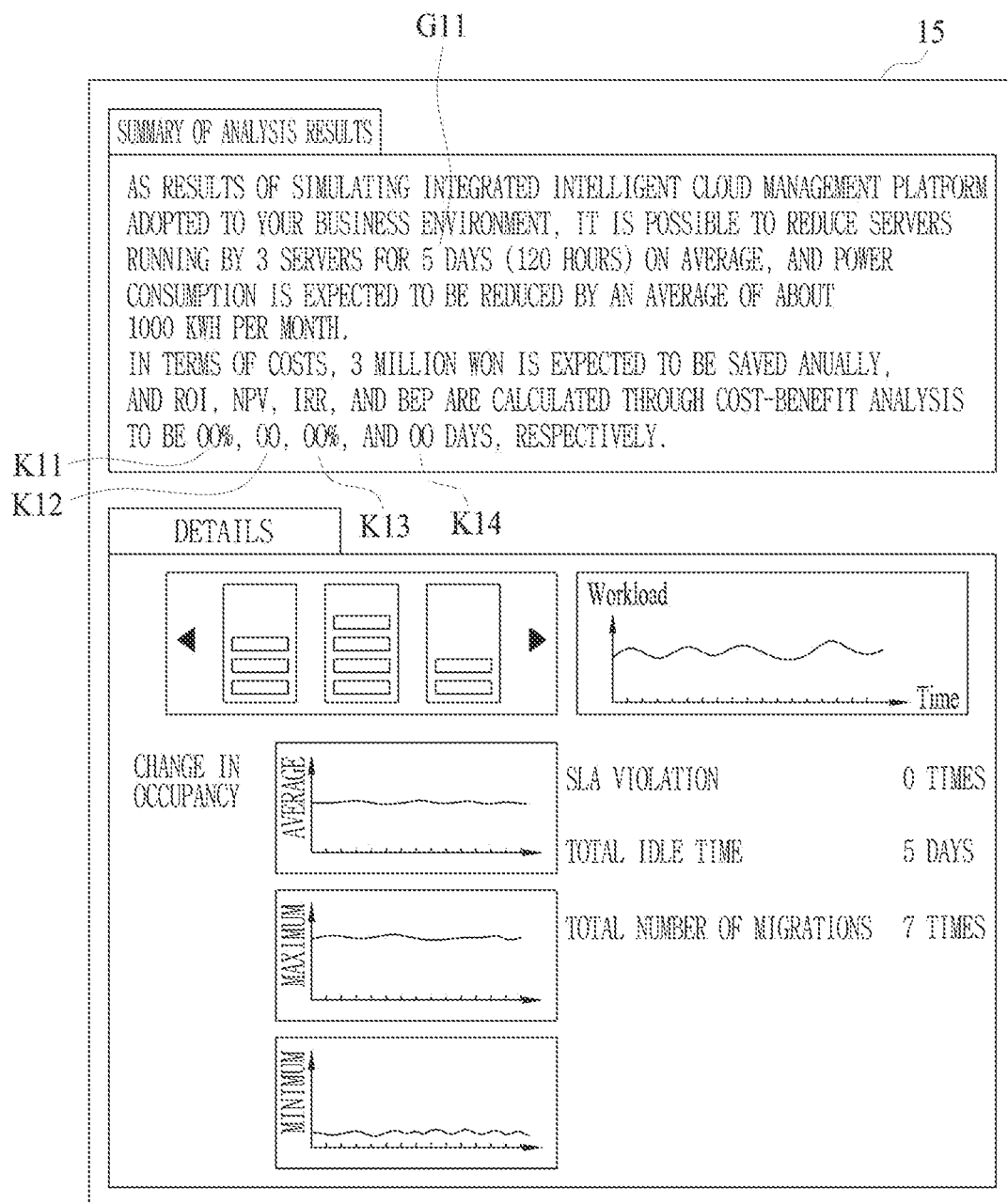
FIG. 15 is a diagram illustrating a process of calculating and displaying economic efficiency information and comparative information in the VM deployment simulation method according to the exemplary embodiment of the present invention.

FIG. 15 is a diagram illustrating a process of calculating and displaying economic efficiency information and comparative information in the VM deployment simulation method according to the exemplary embodiment of the present invention.

When the user selects a VM deployment, selected deployment information may be calculated.

When the user selects a VM deployment, information related to a selected deployment schedule may be calculated.

The processor may calculate economic efficiency information on the basis of the selected deployment information related to a selected deployment which is the VM deployment selected by the user.

The economic efficiency information may indicate data related to economic indicators.

The economic indicators relating to the economic efficiency information may be indicators of economic benefit acquired when the VMs are deployed in the selected deployment in relation to a case in which the VMs are deployed in the past deployment.

For example, the economic indicators may include a return on investment (ROI), a net present value (NPV), an internal rate of return (IRR), a breakeven point (BEP), and the like.

For example, the processor may calculate a cost for running the physical servers on the basis of operating time of the physical servers and an electricity bill per unit when the VMs are deployed in the past deployment on the physical servers.

Also, the processor may calculate an expected cost for running the physical servers on the basis of operating time of the physical servers and an electricity bill per unit when the VMs are deployed in the selected deployment on the physical servers.

The processor may calculate the economic indicators by calculating the amount of benefit on the basis of the costs.

In other words, the economic efficiency information may be calculated on the basis of the observed idle state information and the predicted idle state information.

Information on the amount of investment may be stored in the storage in advance.

Alternatively, the information on the amount of investment may be generated by a signal generated from the input section.

Also, the processor may calculate comparative information for comparing the case in which the VMs are deployed in the selected deployment during the second time period with the case in which the VMs are deployed in the past deployment during the first time period.

The comparative information may be related to information on improvements achieved when the VMs are deployed in the selected deployment on the physical servers.

The display section may display comparative values G11 calculated on the basis of the comparative information.

Also, the display section may display economic indicator values K11, K12, K13, and K14 calculated with the economic indicators.

For example, the comparative information may include information calculated on the basis of the observed occupancy information and the predicted occupancy information.

For example, the comparative information may be information relating to improvements in workloads on the physical servers.

For example, the comparative information may be information calculated on the basis of observed violation information and the predicted violation information.

For example, the comparative information may include information calculated on the basis of an observed violation value and a predicted violation value.

For example, when the observed violation value is 10 and the predicted violation value is 5, a comparative value calculated on the basis of the observed violation information and the predicted violation information may be 5.

Likewise, the comparative information may be information calculated on the basis of the observed idle state information and the predicted idle state information.

In other words, the comparative information may include information calculated on the basis of an observed idle state value and a predicted idle state value.

Also, the comparative information may be information calculated on the basis of the observed migration information and the predicted migration information.

In other words, the comparative information may include information calculated on the basis of an observed migration value and a predicted migration value.

When looking at comparative values displayed on the display section, the user can easily recognize economic benefit which is acquired when the VM are deployed in the selective deployment.

Also, the display section may display predicted state values corresponding to the case in which the VMs are deployed in the selected deployment on the physical servers together with the comparative values.

The first time period may indicate a certain time period before the simulation is performed.

Information related to operation of the physical servers during the first time period may be stored in the storage.

Using the above-described simulation method, it is possible to analyze VM deployment effects in advance without redeploying VMs.

The predetermined machine deployment calculation method will be described in detail below.

The predetermined machine deployment calculation method may include a first predetermined machine deployment calculation method in which migration of VMs is allowed during a migration time period (the second time period) and a second predetermined machine deployment calculation method in which migration of VMs is not taken into consideration during the migration time period.

The user may select a type of predetermined machine deployment calculation method to be used in the previous information input operation.

The detailed description of the first predetermined machine deployment calculation method may be omitted below when overlapping the above description.

The detailed description of the objective function may be omitted below when overlapping the above description.

The second predetermined machine deployment calculation method will be described in detail below.

The processor may calculate machine deployment information which is information related to a machine deployment corresponding to a deployment of the VMs on the first physical server and the second physical server according to the second predetermined machine deployment calculation method.

When a machine deployment is calculated according to the second predetermined machine deployment calculation method, it may be assumed that the physical servers have homogeneous specifications.

The first condition to the fourth condition applied to the first predetermined machine deployment calculation method may not be applied to the second predetermined machine deployment calculation method.

In the second predetermined machine deployment calculation method, only the first objective function, the second objective function, and the third objective function may be taken into consideration.

The detailed description of the second predetermined machine deployment calculation method may be omitted when overlapping that of the first predetermined machine deployment calculation method.

Technical characteristics of each of the prediction device, the VM deployment device, and the VM deployment simulation device may be applied to the other devices.

As an example, the technical characteristics of the prediction device may be applied to the VM deployment device.

Also, technical characteristics of each of the VM workload prediction method, the VM deployment method based on scheduling, and the VM deployment simulation method may be applied to the other methods.

As an example, the technical characteristics of the VM workload prediction method may be applied to the VM deployment simulation method.

The VM management method and system for implementing the VM management method according to the present invention make it possible to predict a future VM workload with high accuracy.

Also, it is possible to predict a future VM workload in a short time.

Also, it is possible to accurately reflect a purpose of a user.

Also, it is possible to stably manage a data center.

Also, it is possible to minimize data loss.

Also, it is possible to minimize resource consumption.

Also, it is possible to obtain results in advance through a simulation.

However, effects of the present invention are not limited to those mentioned above, and effects not mentioned above will be clearly understood by those of ordinary skill in the art from this specification and the accompanying drawings.

Throughout the appended drawings, elements which are irrelevant to the technical spirit of the present invention have been briefly described or omitted to clearly represent the technical spirit of the present invention.

Although the above configuration and characterostocs of the present invention have been described with exemplary embodiments, those of ordinary skill in the art should understand that various modifications or changes can be made within the spirit and scope of the present invention. Therefore, it is noted that such modifications or changes fall within the claims.

What is claimed is:

1. A virtual machine (VM) management method based on a virtual machine workload prediction method implemented by a prediction device and a virtual machine deployment device, which are computing devices, to calculate a prediction load, which is a load on a physical server predicted to be imposed by a plurality of VMs installed on the physical server, the method comprising:
   collecting storage load information which is information related to a storage load corresponding to a load on the physical server caused by the virtual machines installed on the physical server;
   classifying storage loads of the virtual machines into groups by a predetermined classification method;
   forming, when the storage loads are arranged on the basis of an arrangement reference, a prediction model for calculating the prediction load in units of the storage loads classified into a same group;
   selecting at least one of a plurality of prediction models by a predetermined selection method to increase prediction accuracy of a target prediction load which is a load on the physical server predicted to be caused by a target virtual machine to be analyzed;
   calculating target prediction load information which is information related to the target prediction load according to a predetermined calculation method on the basis of target storage load information, which is information related to a target storage load corresponding to a load on the physical server caused by the target virtual machine, and a selection model which is the at least one selected prediction model; and
   deploying at least one of the virtual machines on the physical server based upon the target prediction load information,
   wherein the predetermined selection method includes a predetermined first selection method of selecting, when the target storage load is located in a group of storage loads after the target storage load is arranged on the basis of the arrangement reference, a prediction model produced on the basis of the storage loads classified into the group in which the target storage load is located as the selection model,
   wherein the predetermined selection method includes a predetermined second selection method of selecting, when the target storage load is not located in any group of storage loads among all groups of storage loads after the target storage load is arranged on the basis of the arrangement reference, prediction models corresponding to groups of storage loads satisfying a predetermined condition and apart from the position of the target storage load as the selection model,
   wherein the predetermined calculation method is a method of calculating, when the selection model is singular, the target prediction load information by inputting the target storage load information to the selection model,
   wherein the predetermined calculation method is a method of calculating, when the selection model has a plurality of selection models, the target prediction load information by merging a plurality of target preliminary loads on a basis of weights calculated on a basis of a ratio of separation distances from the target storage load to storage load groups corresponding to the selection models, and
   wherein a plurality of pieces of target preliminary load information related to a plurality of a target preliminary loads is calculated by inputting the target storage load information to the selection models.

2. The virtual machine management method of claim 1, wherein the storage load is a degree of operation of a CPU of a physical server resulting from running virtual machines.

3. The virtual machine management method of claim 1, wherein the arrangement reference is a reference related to length of a task time and change rates of storage loads during the task time.

4. The virtual machine management method of claim 1, wherein the predetermined condition requires the group to be located within a certain distance from the target storage load when the target storage load is arranged on the basis of the arrangement reference.

5. The virtual machine management method of claim 1, the predetermined condition requires the group to be located within a reference range from a reference distance which is a shortest one of distances from the target storage load to the groups of storage loads when the target storage load is arranged on the basis of the arrangement reference.

6. The virtual machine management method of claim 1, the predetermined calculation method is a method in which a given one of the weights is decreased as the distance between the target storage load and a storage load group corresponding to the selection model associated with the given weight increases.

7. The virtual machine management method of claim 6, the predetermined calculation method is a method in which the given one of the weights is increased as the distance between the target storage load and the storage load group corresponding to the selection model associated with the given weight decreases.

8. The virtual machine management method of claim 1, the predetermined calculation method is a method of calculating the target prediction load information for a certain time period.

9. A virtual machine management system for deploying at least one virtual machine on at least one physical server based upon a load on a physical server predicted to be imposed by a plurality of virtual machines installed on the physical server, the virtual machine management system comprising:
- a prediction device, which is a computing device, comprising a prediction storage storing storage load information which is information related to a storage load corresponding to a load on the physical server caused by the virtual machines installed on the physical server;
- a prediction controller performing computation including processing information required for implementing the virtual machine workload prediction method; and
- a virtual machine deployment device, which is a computing device, comprising a deployment processor deploying at least one of the virtual machines on at least one of the physical server based upon target prediction load information;

wherein the virtual machine workload prediction method comprises:
- collecting storage load information which is information related to a storage load corresponding to a load on the physical server caused by the virtual machines installed on the physical server;
- classifying storage loads of the virtual machines into groups by a predetermined classification method;
- forming, when the storage loads are arranged on the basis of an arrangement reference, a prediction model for calculating the prediction load in units of the storage loads classified into a same group;
- selecting at least one of a plurality of prediction models by a predetermined selection method to increase prediction accuracy of a target prediction load which is a load on the physical server predicted to be caused by a target virtual machine to be analyzed; and
- calculating target prediction load information which is information related to the target prediction load according to a predetermined calculation method on the basis of target storage load information, which is information related to a target storage load corresponding to a load on the physical server caused by the target virtual machine, and a selection model which is the at least one selected prediction model, wherein the predetermined selection method includes a predetermined first selection method of selecting, when the target storage load is located in a group of storage loads after the target storage load is arranged on the basis of the arrangement reference, a prediction model produced on the basis of the storage loads classified into the group in which the target storage load is located as the selection model, wherein the predetermined selection method includes a predetermined second selection method of selecting, when the target storage load is not located in any group of storage loads among all groups of storage loads after the target storage load is arranged on the basis of the arrangement reference, prediction models corresponding to groups of storage loads satisfying a predetermined condition and apart from the position of the target storage load as the selection model, wherein the predetermined calculation method is a method of calculating, when the selection model is singular, the target prediction load information by inputting the target storage load information to the selection model, wherein the predetermined calculation method is a method of calculating, when the selection model has a plurality of selection models, the target prediction load information by merging a plurality of target preliminary loads on a basis of weights calculated on a basis of a ratio of separation distances from the target storage load to storage load groups corresponding to the selection models, and wherein a plurality of pieces of target preliminary load information related to a plurality of a target preliminary loads is calculated by inputting the target storage load information to the selection models.

\* \* \* \* \*